United States Patent
Chen et al.

(10) Patent No.: US 9,936,485 B2
(45) Date of Patent: Apr. 3, 2018

(54) METHOD AND APPARATUS OF OBTAINING SCHEDULING INFORMATION OF A DATA CHANNEL

(71) Applicants: Hua-Min Chen, Beijing (CN); Pei-Kai Liao, Nantou County (TW); Xiangyang Zhuang, Lake Zurich, IL (US)

(72) Inventors: Hua-Min Chen, Beijing (CN); Pei-Kai Liao, Nantou County (TW); Xiangyang Zhuang, Lake Zurich, IL (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 324 days.

(21) Appl. No.: 14/758,425

(22) PCT Filed: Jan. 10, 2014

(86) PCT No.: PCT/CN2014/070445
§ 371 (c)(1),
(2) Date: Jun. 29, 2015

(87) PCT Pub. No.: WO2014/108090
PCT Pub. Date: Jul. 17, 2014

(65) Prior Publication Data
US 2015/0358985 A1    Dec. 10, 2015

(30) Foreign Application Priority Data
Jan. 11, 2013 (CN) .......................... 2013 1 0011769

(51) Int. Cl.
*H04W 72/04* (2009.01)
*H04W 48/12* (2009.01)
(Continued)

(52) U.S. Cl.
CPC ..... *H04W 72/0406* (2013.01); *H04W 72/042* (2013.01); *H04J 11/0086* (2013.01);
(Continued)

(58) Field of Classification Search
CPC .................. H04J 11/0069–11/0093; H04L 5/0048–5/0058; H04W 72/005–72/14;
(Continued)

(56) References Cited

U.S. PATENT DOCUMENTS

| | | | |
|---|---|---|---|
| 2013/0242882 A1* | 9/2013 | Blankenship | H04W 72/042 370/329 |
| 2013/0252606 A1* | 9/2013 | Nimbalker | H04B 17/309 455/434 |
| 2014/0286297 A1 | 9/2014 | Zhao et al. | |

FOREIGN PATENT DOCUMENTS

| CN | 102170703 | 8/2011 |
|---|---|---|
| CN | 102395206 | 3/2012 |

(Continued)

OTHER PUBLICATIONS

International Search Report dated Apr. 16, 2014, issued in application No. PCT/CN2014/070445.

*Primary Examiner* — Timothy J Weidner
(74) *Attorney, Agent, or Firm* — McClure, Qualey & Rodack, LLP

(57) ABSTRACT

A method for obtaining scheduling information of a data channel is disclosed. The method includes: receiving a set of radio resources for a set of candidate control channels, wherein a part of the set of candidate control channels constitute the enhanced common search space (ECSS) for an enhanced physical downlink control channel (EPDCCH); attempting to decode each candidate control channel to obtain a physical control channel; and obtaining scheduling information of the data channel from the decoded physical control channel.

43 Claims, 22 Drawing Sheets

(51) Int. Cl.
*H04W 84/04* (2009.01)
*H04L 5/00* (2006.01)
*H04J 11/00* (2006.01)

(52) U.S. Cl.
CPC .......... *H04L 5/0053* (2013.01); *H04W 48/12* (2013.01); *H04W 84/042* (2013.01)

(58) Field of Classification Search
CPC . H04W 74/002–74/0891; H04W 84/04–84/08
See application file for complete search history.

(56) References Cited

FOREIGN PATENT DOCUMENTS

| | | |
|---|---|---|
| CN | 102573094 | 7/2012 |
| CN | 102594513 | 7/2012 |
| CN | 102624489 | 8/2012 |

\* cited by examiner

←— Indications in MIB —→

| .... | L-bit | .... |

⇩

$N_{\text{offset}}^{\text{ECSS}} = 3$

FIG. 12A

←— Indications in MIB —→

| .... | N-bit | .... |

⇩ Index = 1

| Index | Value |
|---|---|
| 0 | $N_{\text{offset}}^{\text{ECSS}} = 0$ |
| ⋮ | ⋮ |
| K | $N_{\text{offset}}^{\text{ECSS}} = 25$ |

⇩

$N_{\text{offset}}^{\text{ECSS}} = 3$

FIG. 12B

←— Indications in EPCFICH —→

| .... | Q-bit | .... |

⇩ Index = 1

| Index | Value |
|---|---|
| 0 | $N_{\text{offset}}^{\text{ECSS}} = 0$ |
| ⋮ | ⋮ |
| K | $N_{\text{offset}}^{\text{ECSS}} = 25$ |

⇩

$N_{\text{offset}}^{\text{ECSS}} = 3$

FIG. 12C $N_{\text{offset}}^{\text{ECSS}} = f(N_{\text{RB}}^{\text{ECSS}}, N_{\text{RB}}^{\text{DL}}, N_{\text{ID}}^{\text{cell}}, n_{\text{sf}})$

⇩

$N_{\text{offset}}^{\text{ECSS}} = 3$

FIG. 12D

METHOD AND APPARATUS OF OBTAINING SCHEDULING INFORMATION OF A DATA CHANNEL

CROSS REFERENCE TO RELATED APPLICATIONS

This application claims is a National Phase Patent Application of PCT Application No. PCT/CN2014/070445, filed on Jan. 10, 2014, which the benefit of CN Provisional Application No. 201310011769.9 filed 2013 Jan. 11 and entitled "METHODS OF STAND-ALONE OPERATION WITH ENHANCED PHYSICAL DOWNLINK CONTROL CHANNEL". The entire contents of which are hereby incorporated by reference.

FIELD OF INVENTION

Aspects of the present invention relate generally to wireless communications systems, and more particularly, to methods and apparatuses of obtaining scheduling information of a data channel.

BACKGROUND OF THE INVENTION

In 3GPP LTE Release 11 system, one feature is an enhanced physical downlink control channel (EPDCCH). Compared to the legacy physical downlink control channel (PDCCH), the main motivation of the EPDCCH is
- able to support increased control channel capacity;
- able to support frequency-domain inter-cell interference coordination (ICIC);
- able to achieve improved spatial reuse of a control channel resource;
- able to support beamforming and/or diversity;
- able to operate on the new carrier type (NCT) and in MBSFN subframes;
- able to coexist on the same carrier as legacy user equipment (UE).

In Release 11, the main design for the EPDCCH focuses on configuring an enhanced UE-specific search space (EUSS) in the EPDCCH detected by the UEs. Except for the predefined rules and parameters, all necessary configurations are from radio resource control (RRC) or higher layers. Further, the EPDCCH may not work without legacy PDCCH because no common search space is defined for the EPDCCH.

Up to now, the question of how to support the EPDCCH in a stand-alone operation, especially in cases with a stand-alone new carrier type (NCT), is still an open issue. In Release 12, the related topic in the 2nd level of the NCT is how to let the NCT operate independently without always being associated with a legacy carrier. In such a case, there is no legacy PDCCH, and all control signaling are assumed to be transmitted in the EPDCCH. Then, a stand-alone EPDCCH must be designed. In other words, an enhanced common search space (ECSS) should be supported in the EPDCCH by default and without the RRC or higher layers signaling to schedule the common control message.

SUMMARY OF THE INVENTION

A detailed description is given in the following embodiments with reference to the accompanying drawings.

Methods and apparatuses of obtaining scheduling information of a data channel are provided.

In one exemplary embodiment, the invention is directed to a method for obtaining scheduling information of a data channel. The method comprises: receiving a set of radio resources for a set of candidate control channels, wherein a part of the set of candidate control channels constitute the enhanced common search space (ECSS) for an enhanced physical downlink control channel (EPDCCH); attempting to decode each candidate control channel to obtain a physical control channel; and obtaining scheduling information of the data channel from the decoded physical control channel.

In one exemplary embodiment, the invention is directed to an apparatus for obtaining scheduling information of a data channel. The apparatus operates as User Equipment (UE), and comprises a wireless module and a controller module. The wireless module is configured to perform wireless transmission and reception to and from a service network. The controller module is coupled to the wireless module and configured to receive a set of radio resources for a set of candidate control channels, wherein a part of the set of candidate control channels constitute the enhanced common search space (ECSS) for an enhanced physical downlink control channel (EPDCCH), attempting to decode each candidate control channel to obtain a physical control channel, and obtaining scheduling information of the data channel from the decoded physical control channel.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIGS. 12A~12D are schematic diagrams illustrating four examples of indicating the additional offset to the reserved radio resources for the common EPDCCH set according to one embodiment of the present invention.

DETAILED DESCRIPTION

Figure 1:
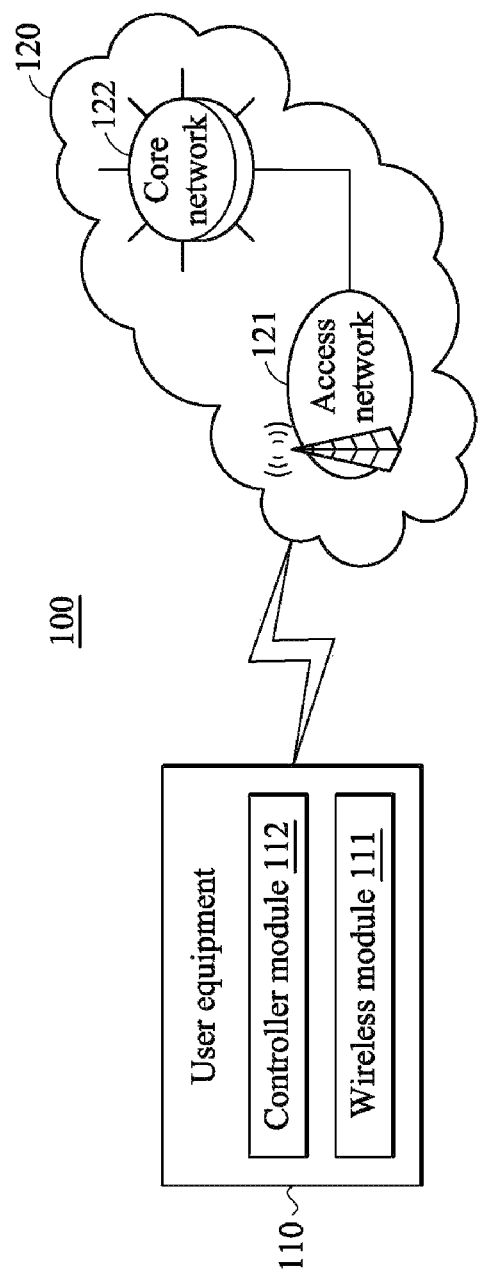
FIG. 1 is a schematic diagram illustrating a wireless communications system according to one embodiment of the present invention.

Several exemplary embodiments of the present disclosure are described with reference to FIGS. 1 through 21, which generally relate to a method and an apparatus of obtaining scheduling information of a data channel. It is to be understood that the following disclosure provides various embodiments as examples for implementing different features of the present disclosure. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The following description is of the best-contemplated mode of carrying out the invention. This description is made for the purpose of illustrating the general principles of the invention and should not be taken in a limiting sense. Note that the 3GPP specifications described herein are used to teach the spirit of the invention, and the invention is not limited thereto.

To further enhance the frequency and the power transmission performance, the new carrier type is one of the techniques for providing a smooth transition from legacy LTE systems. In the LTE Release 11 system, dedicated data channels can be supported by downlink scheduling information (DL scheduling information) or uplink grant information (uplink grant) in the enhanced physical downlink control channel (EPDCCH). However, new mechanisms have to be designed, e.g. to support scheduling of the broadcast common message by the EPDCCH, to enable LTE Release 12 system to support stand-alone operation of the new carrier type. Embodiments of the present invention provide methods and apparatuses to support the stand-alone operation in new carrier type.

FIG. 1 is a block diagram illustrating a schematic diagram of a wireless communications system according to one embodiment of the present invention. In the wireless communications system 100, the user equipment (UE) 110 is wirelessly connected to the service network 120 for obtaining wireless services. The service network 120 may comprise an access network 121 and a core network 122, wherein the access network 121 may be a Universal Terrestrial Radio Access Network (UTRAN) in the WCDMA technology or an E-UTRAN (Evolved-UTRAN) in the LTE/LTE-Advanced technology, and the core network 122 may be a GPRS core in the WCDMA technology or an Evolved Packet Core (EPC) in the LTE/LTE-Advanced technology. The UE 110 may also be called an access terminal (AT), a wireless communications device, terminal, or some other terminology. The UE 110 comprises a wireless module 111 and a controller module 112, wherein the wireless module 111 is coupled to the controller module 112. The wireless module 111 is configured to perform the functionality of wireless transmission and reception to and from the service network 120. The controller module 112 is configured for controlling the operation of the wireless module 111 and other functional components, such as a display unit and/or keypad serving as the MMI (man-machine interface), a storage unit storing the program codes of applications or communication protocols, or others. To further clarify, the wireless module 111 may be a radio frequency (RF) unit, and the controller module 112 may be a general-purpose processor or a micro-control unit (MCU) of a baseband unit. The baseband unit may contain multiple hardware devices to perform baseband signal processing, including analog-to-digital conversion (ADC)/digital-to-analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the mobile communication system, wherein the radio frequency may be 900 MHz, 1900 MHz, or 2100 MHz utilized in WCDMA systems, or may be 900 MHz, 2100 MHz, or 2.6 GHz utilized in LTE/LTE-Advanced systems, or others depending on the Radio Access Technology (RAT) in use.

In 3GPP LTE Release 11, enhanced UE-specific search space (EUSS) is defined in the EPDCCH set(s), which comprises either continuous or distributed radio resources or physical resource block (PRB) pairs, for the scheduling of downlink or uplink data transmission dedicated to one or a group of UEs. The EPDCCH set(s) is configured by a radio resource control (RRC) or higher layer and at most two EPDCCH sets can be configured in one subframe on the same carrier. However, an enhanced common search space (ECSS) for the scheduling of broadcast message transmission is not defined in the EPDCCH design of 3GPP LTE Release 11, wherein the broadcast message comprises system information block (SIB), paging, RACH and so on. To enable the stand-alone operation of the EPDCCH without the support of the PDCCH, the ECSS should be supported in 3GPP LTE Release 12 system.

In addition to the EPDCCH set(s) configured by the RRC or higher layer for the support of the EUSS, it is proposed in the invention that another EPDCCH set is defined for the support of the ECSS and its location is determined through a predefined rule in the specification, the signaling in the physical broadcast channel (PBCH) only, or the signaling in the PBCH and an enhanced physical control format indication channel (EPCFICH). The PBCH occupies a fixed time-frequency location and a size of radio resources with a fixed periodicity on the basis of radio frame, which comprises several subframes, and is used to transmit a master information block (MIB), which includes the system information required for the UE to access the network immediately after the downlink synchronization. The EPCFICH is transmitted in every subframe or several subframes, and can be used to signal the configuration of the proposed EPDCCH set for the support of common search space subframe by subframe or with a periodicity of several subframes. For explanation, the proposed EPDCCH set supporting ECSS is named as a common EPDCCH set in the following paragraphs and the EPDCCH set(s) configured by the RRC or higher layer to support the EUSS is called as a configured EPDCCH set(s). To be more precise, the radio resources of the common EPDCCH set are reserved for candidate EPDCCHs, wherein the unused radio resources within the reserved radio resources can be used for the transmission of other channels or signals. The terminology used throughout the invention is an example to describe the proposed concepts and methods clearly and does not limit the application in other systems.

Figure 2:
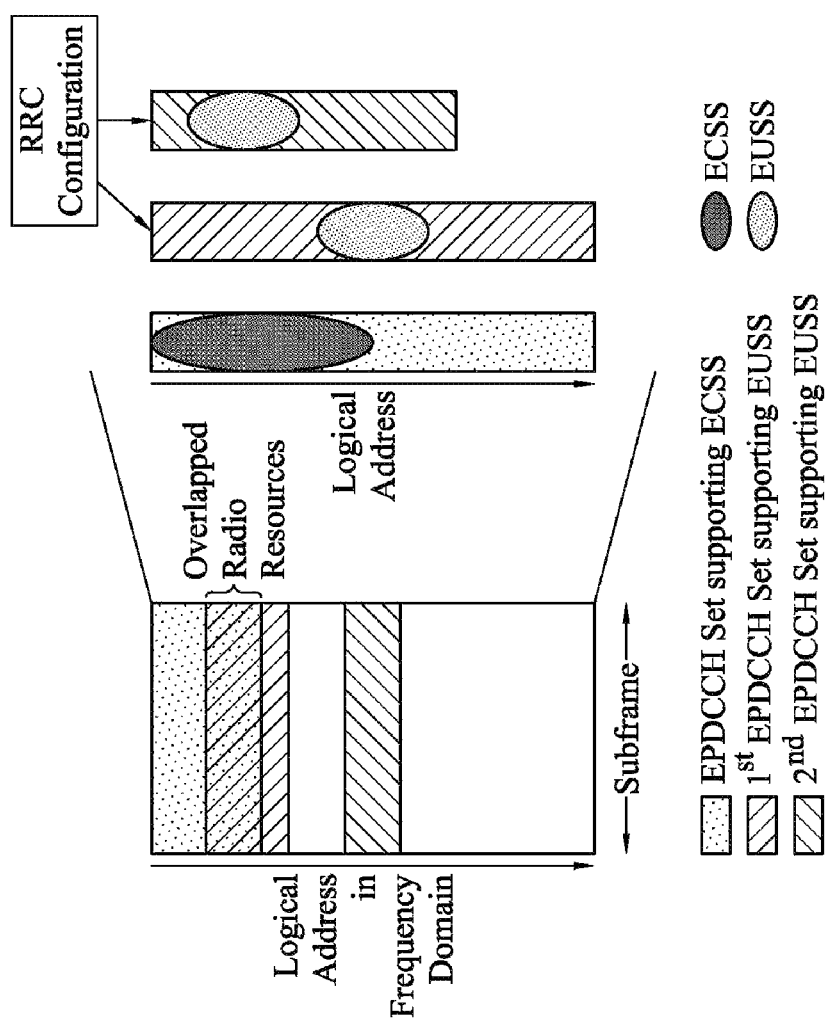
FIG. 2 is a schematic diagram illustrating an enhanced physical downlink control channel (EPDCCH) supporting an enhanced common search space (ECSS) and an enhanced UE-specific search space (EUSS) according to one embodiment of the present invention.

In one embodiment, only ECSS is supported in the common EPDCCH set by default and the configured EPDCCH set(s) is configured by the RRC or higher layer to support EUSS when or after the connection of the RRC or higher layer is established, wherein the configured EPDCCH set(s) is not required to be mutually orthogonal to the radio resources of the common EPDCCH set supporting the ECSS. In other words, the radio resources of the common EPDCCH set supporting the ECSS can be mutually orthogonal to, partially or fully overlapped with the configured EPDCCH set(s) supporting the EUSS. FIG. 2 illustrates a schematic diagram of the EPDCCH supporting the ECSS and EUSS according to one embodiment of the present invention. The RRC or higher layer configuration has to be provided for the UEs to monitor the EUSS when or after the RRC or higher layer connection is established.

Figure 3:
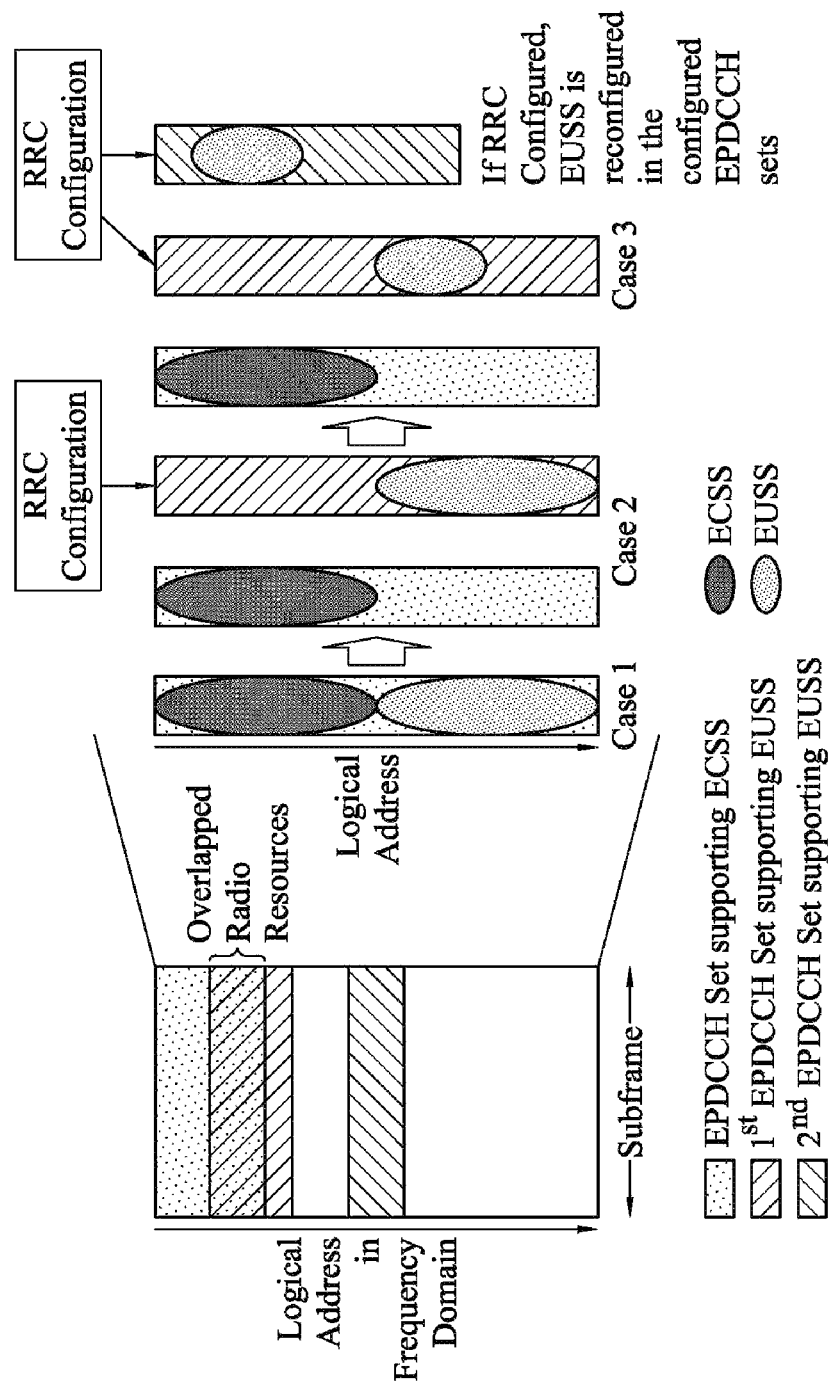
FIG. 3 is a schematic diagram illustrating the EPDCCH supporting the ECSS and the EUSS according to one embodiment of the present invention.
Figure 4:
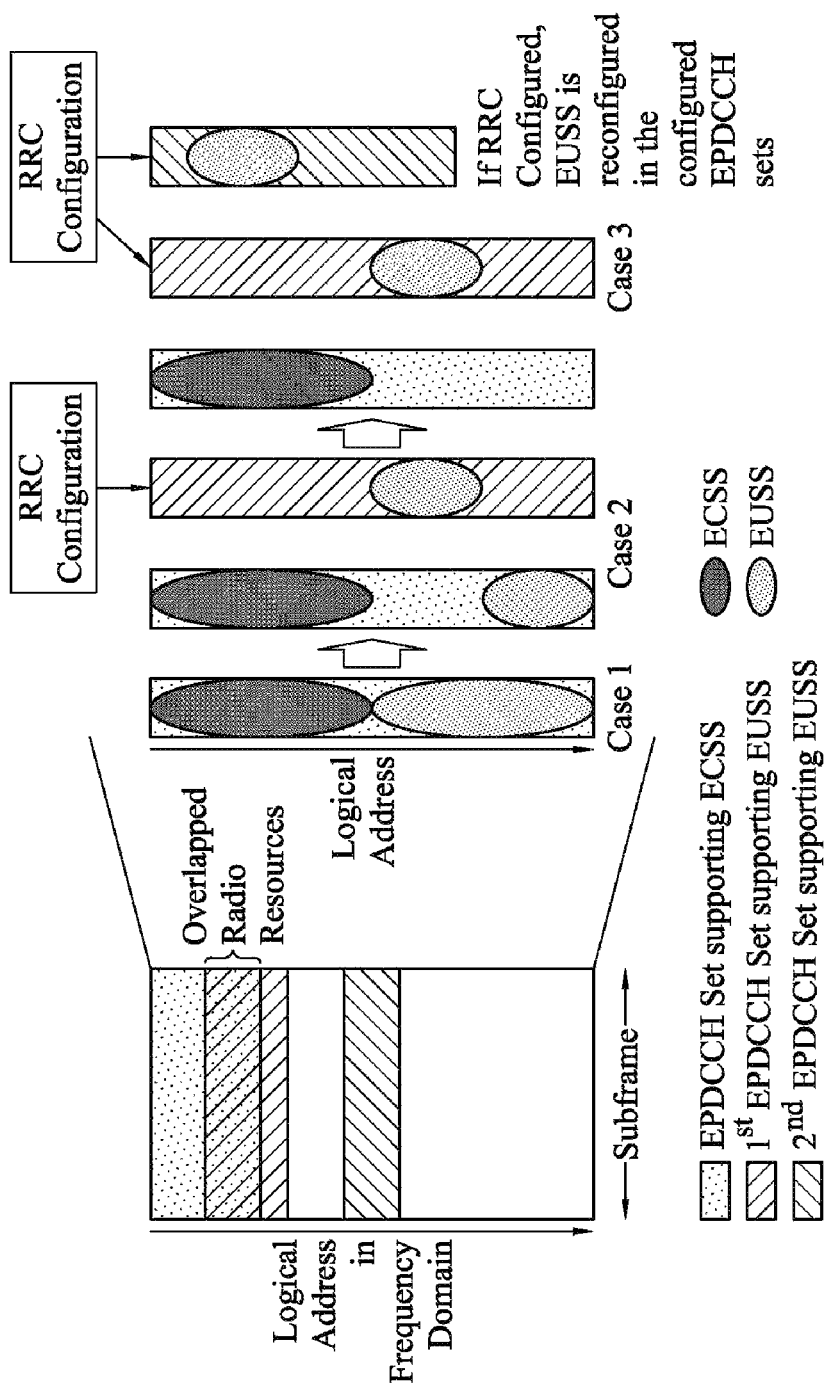
FIG. 4 is a schematic diagram illustrating the EPDCCH supporting the ECSS and the EUSS according to one embodiment of the present invention.

In another embodiment, the common EPDCCH set can support the ECSS by default without the RRC or higher layer configuration. If needed, another EPDCCH set(s) can be configured by the RRC or higher layer to support EUSS. The EUSS can be supported only in the configured EPDCCH set(s) or in both the common and configured EPDCCH set(s) if a single configured EPDCCH set is configured by the RRC or higher layer. The EUSS is supported only in the configured EPDCCH sets if two configured EPDCCH sets are configured by the RRC or higher layer. FIG. 3 and FIG. 4 illustrate two schematic diagrams of the EPDCCH supporting the ECSS and the EUSS according to one embodiment of the present invention. In FIG. 3, the ECSS and the EUSS are both defined in the common EPDCCH by default (Case 1 in FIG. 3). If there is a EPDCCH set configured by the RRC or higher layer, the EUSS for the UEs used to monitor may be moved to the configured EPDCCH set(s) (Case 2 and Case 3 in FIG. 3). In FIG. 4, the ECSS and the EUSS are both defined in the common EPDCCH set by default (Case 1 and Case 2 in FIG. 4). If there are two EPDCCH sets configured by the RRC or higher layer, the EUSS for the UEs used to monitor only exists in the configured EPDCCH sets (Case 3 in FIG. 4). In the scheme that EUSS can be in the common EPDCCH set, the UE can utilize the EUSS for unicast data reception or transmission directly without additional configuration signaling before the RRC or higher layer connection is established. If needed, the EUSS can be reconfigured in the newly configured EPDCCH set(s) when or after the RRC or higher layer connection is established.

A predefined rule can be used for the UEs to determine a predetermined set of radio resources for the common EPDCCH set supporting the ECSS. The predefined rule is a function of a cell ID to enable a cell plan for simple inter-cell interference coordination (ICIC). In the embodiment, the cell ID can be a physical cell ID or a virtual cell ID. To randomize the interference from the common EPDCCH set supporting the ECSS to neighboring cells, especially for data channels, the predefined rule can further be a function of a subframe index.

Figure 5A:
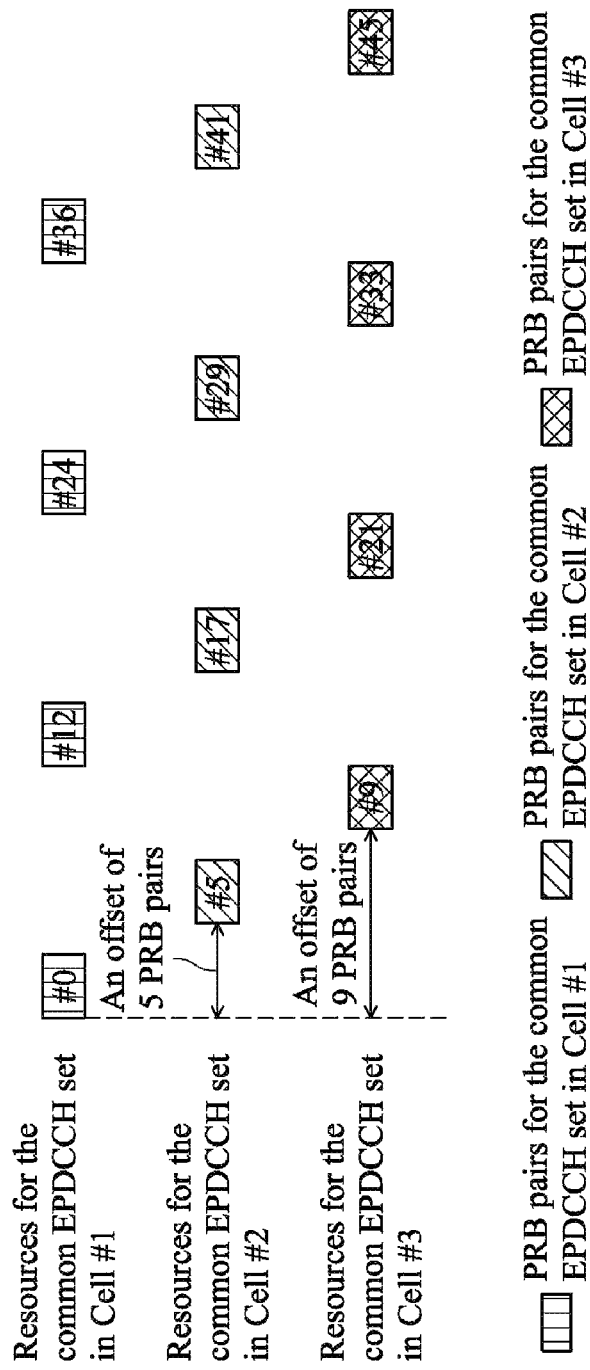
FIGS. 5A-5C are schematic diagrams illustrating the additional offset based on different basis units according to one embodiment of the present invention.
Figure 5B:
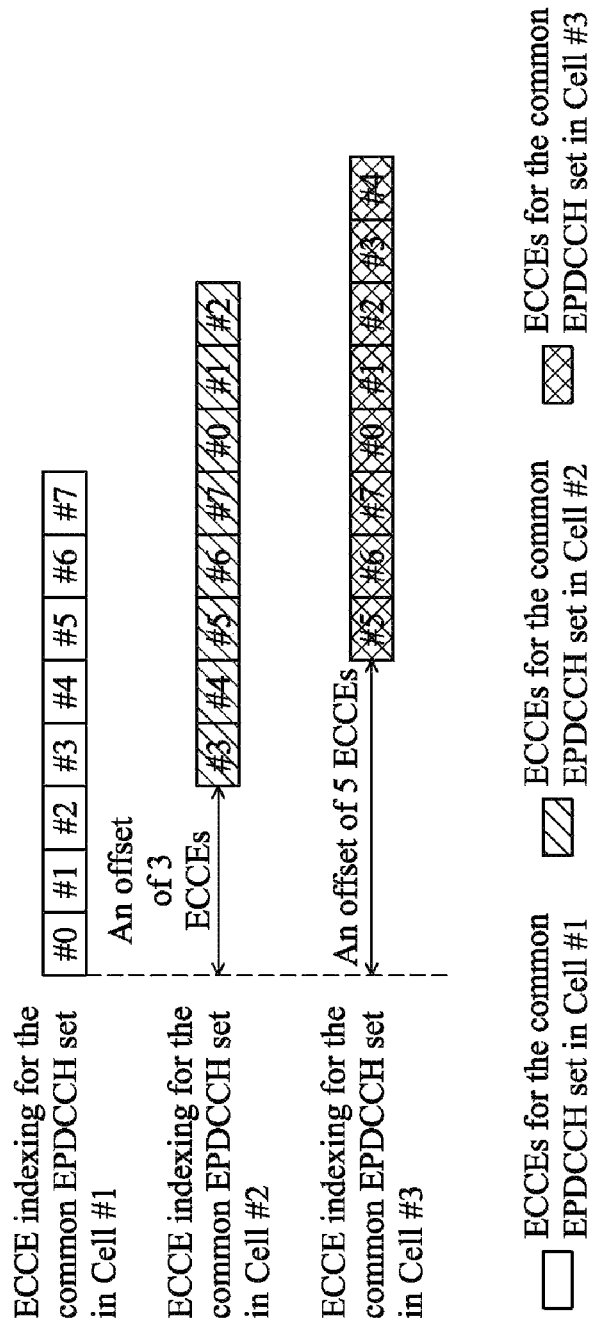
Figure 5C:
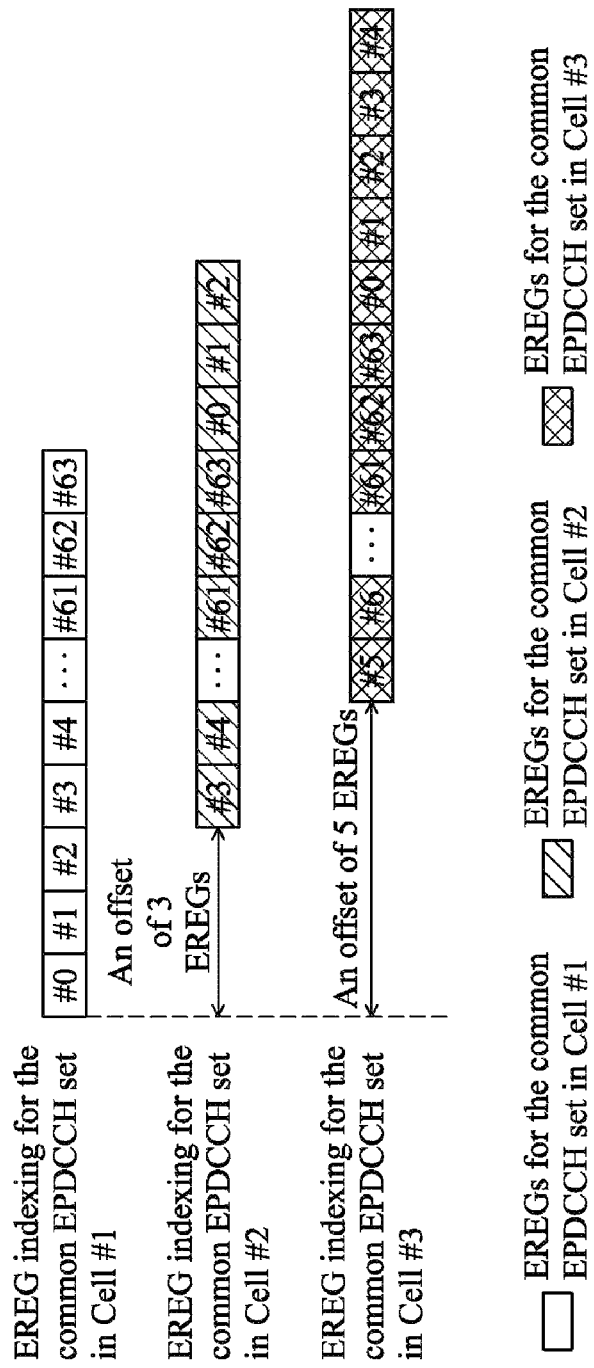

A semi-static configuration of the common EPDCCH set supporting the ECSS can be carried in the MIB to reduce the signaling overhead. The semi-static configuration comprises the size of reserved radio resources, an offset value for the inter-cell interference coordination or both. The offset can be either a physical frequency offset to the set of radio resources of the common EPDCCH set or a logical offset of a search space within the common EPDCCH set. The offset can be either a number of the PRB pairs, the enhanced control channel elements (ECCEs), or the enhanced resource element groups (EREGs). If the offset is based on a basis unit of PRB pair, the ICIC of the PRB-level can be supported. If the offset is based on a basis unit of ECCE or EREG, either the ICIC of the ECCE/EREG level or an inter-cell randomization can be supported. To be more precise, the resource reusing efficiency is improved. FIGS. 5A–5C are schematic diagrams illustrating the additional offset based on different basis units according to one embodiment of the present invention. In FIG. 5A, the offset of the resources is based on the PRB pair level. The four PRB pairs are mapped to different physical locations of different cells to support ICIC. In FIG. 5B and FIG. 5C, the offset is performed to the ECCEs and EREGs, respectively. Then, the locations of different cells start from different ECCE/EREG indexes. In other words, the logical resources are mapped to different/same physical locations to coordinate inter-cell interference among different cells, randomize the inter-cell interferences or/and improve the resource reusing efficiency.

A dynamic configuration of the common EPDCCH set supporting the ECSS can be carried in the EPCFICH and can be changed subframe-by-subframe or a period of several subframes to enhance the radio resource utilization efficiency. The dynamic configuration at least comprises the offset value, or the size of radio resource wherein the radio resource is used to transmit the common EPDCCH set, or both.

Figure 6A:
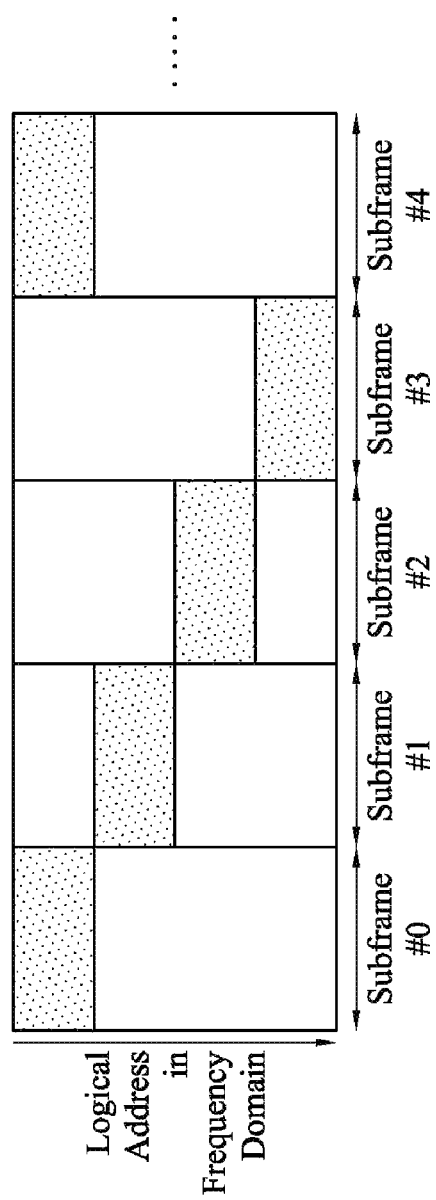
FIGS. 6A-6B are schematic diagrams illustrating the common EPDCCH set hopping in a frequency domain according to one embodiment of the present invention.
Figure 6B:
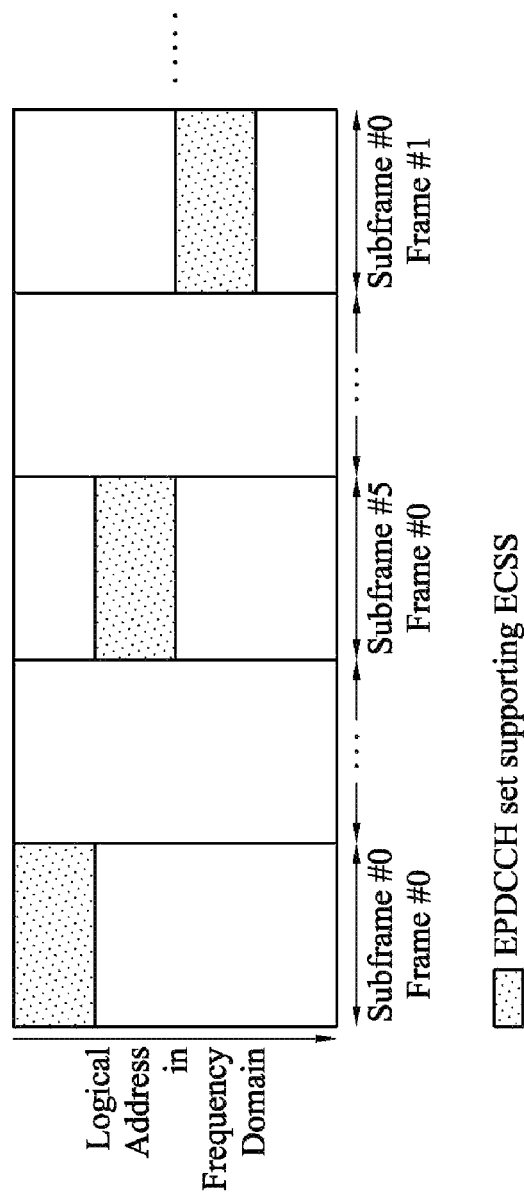

For the configuration signaling in the MIB or the EPC-FICH, to randomize the interference from the transmission in the common EPDCCH set to the neighboring cells, especially for a data channel, the time-frequency or a logical location of the radio resources for the common EPDCCH set can further change with time according to a predefined rule. In other words, the radio resource predefined rule of the common EPDCCH set is a function of the subframe index. The diversity may further be guaranteed by the scheme as well. If the location changes with a couple of subframes, the subframe index used to calculate the offset can be the index of one subframe within the periodicity. FIGS. 6A~6B are schematic diagrams illustrating the common EPDCCH set hopping in a frequency domain according to one embodiment of the present invention. In FIG. 6A, the time-frequency or logical location of the common EPDCCH set can hop or change subframe by subframe. In another embodiment, shown in FIG. 6B, the time-frequency or logical location of radio resources for the common EPDCCH set can change every a couple of subframes according to a predefined rule.

Additionally, to guarantee the performance, the distributed transmission may be applied to the common EPDCCH and the radio resources of the common EPDCCH can be distributed over the whole channel bandwidth evenly to maximize the diversity gain.

In the invention, three possible UE procedures are proposed to support the stand-alone operation of the EPDCCH, i.e., the support of ECSS in the common EPDCCH set. Direction #1 defines a predefined rule indicating a predetermined set of radio resources for the common EPDCCH set supporting the ECSS. In Direction #1, the UE can determine the physical location of the common EPDCCH set according to the predefined rule, comprising the size of the reserved radio resources for the common EPDCCH set, or the additional frequency offset used to the reserved radio resources. Then, the UE may perform a blind detection in the common EPDCCH set and determine the location of scheduled broadcast information, such as SIB. Finally, the UE may decode the scheduled SIB in the corresponding location. During a period of the resource allocation for the common EPDCCH set, the offset and the size of the radio resources for the common EPDCCH set are fixed. The resource allocation under a predetermined rule does not change unless another period of the resource allocation has arrived. Therefore, Direction #1 is also named as the design method based on a predefined rule.

Based on the above discussion, the UE procedure under Direction #1 may be summarized as
    Step 1: the UE determines the location of the common EPDCCH set according to a predefined rule.
    Step 2: the UE performs the blind detection in the common EPDCCH set and determines the location of the scheduled SIB.
    Step 3: the UE decodes the scheduled SIB in the corresponding location.
    Continuation: next period of the resource allocation for the common EPDCCH set.
    Perform Step 2~Step 3 if there is no new period of the resource allocation for the common EPDCCH set.
    Perform Step 1~Step 3 if a new period of the resource allocation for the common EPDCCH set has arrived.

Figure 7:
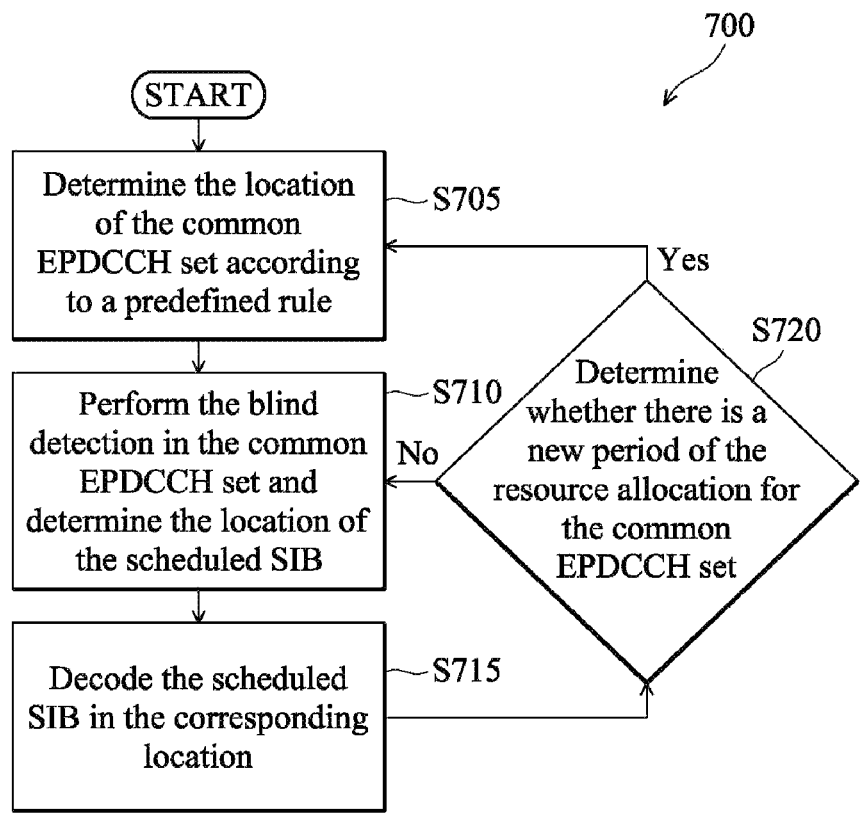
FIG. 7 is a flow diagram illustrating a method for obtaining scheduling information based on a predefined rule according to the embodiment of the present invention.

FIG. 7 is a flow diagram illustrating a method 700 for obtaining scheduling information based on a predefined rule according to the embodiment of the present invention. It is noted that the method is performed by UE. First, in step S705, the UE determines the location of the common EPDCCH set according to a predefined rule. Then, in step S710, the UE performs the blind detection in the common EPDCCH set and determines the location of the scheduled SIB. In step S715, the UE decodes the scheduled SIB in the corresponding location according to the obtained the scheduling information in step S710 by the blind detection. In step S720, the UE determines whether there is a new period of the resource allocation for the common EPDCCH set. When the UE determines that the new period of the resource allocation for the common EPDCCH set has arrived, the method returns to step S705. Otherwise, the method returns to step S710. It should be noted that, if there is a configured EPDCCH set(s) for some UEs, the UEs should also perform blind decoding in the configured EPDCCH set(s) for UE-specific scheduling information. After obtaining the UE-specific scheduling information by blind decoding in the configured EPDCCH set(s), the UEs should decode the scheduled UE-specific data in the corresponding location within the data region, or transmit the UE-specific data in the corresponding location according to the UE-specific scheduling information. If there is no configured EPDCCH set(s) for some UEs, the UEs perform the blind detection in the common EPDCCH set and perform the corresponding procedures.

Direction #2 is used to indicate the location of the common EPDCCH set by the configuration in the MIB, wherein the MIB is carried by the PBCH. In Direction #2, the UE may determine the physical location of the common EPDCCH set by decoding the MIB, wherein the configuration information at least indicates the size of the reserved radio resources for the common EPDCCH set or the additional frequency offset used to the reserved radio resources explicitly or implicitly. Then, the UE may obtain the common control message, such as SIB, after determining the location of the common control message by decoding the scheduling information blindly in the common EPDCCH set. During a period of the MIB, the offset and the size of the radio resources for the common EPDCCH set are fixed. The configuration in the MIB does not change unless another period of the MIB has arrived. Therefore, Direction #2 is also named as the design method based on the MIB.

Based on the above discussion, the UE procedure under Direction #2 may be summarized as
    Step 1: the UE receives the MIB indicating the radio resources for the common EPDCCH set.
    Step 2: the UE obtains the location of the common EPDCCH set by decoding the configuration in the MIB.
    Step 3: the UE performs a blind decoding within the common EPDCCH set and determines the location of scheduled SIB by decoding the scheduling information for the SIB.
    Step 4: the UE decodes the scheduled SIB in the corresponding location.

Continuation: next period of the MIB
  Perform Step 3~Step 4 if there is no new period of the MIB.
  Perform Step 1~Step 4 if a new period of the MIB has arrived.

Figure 8:
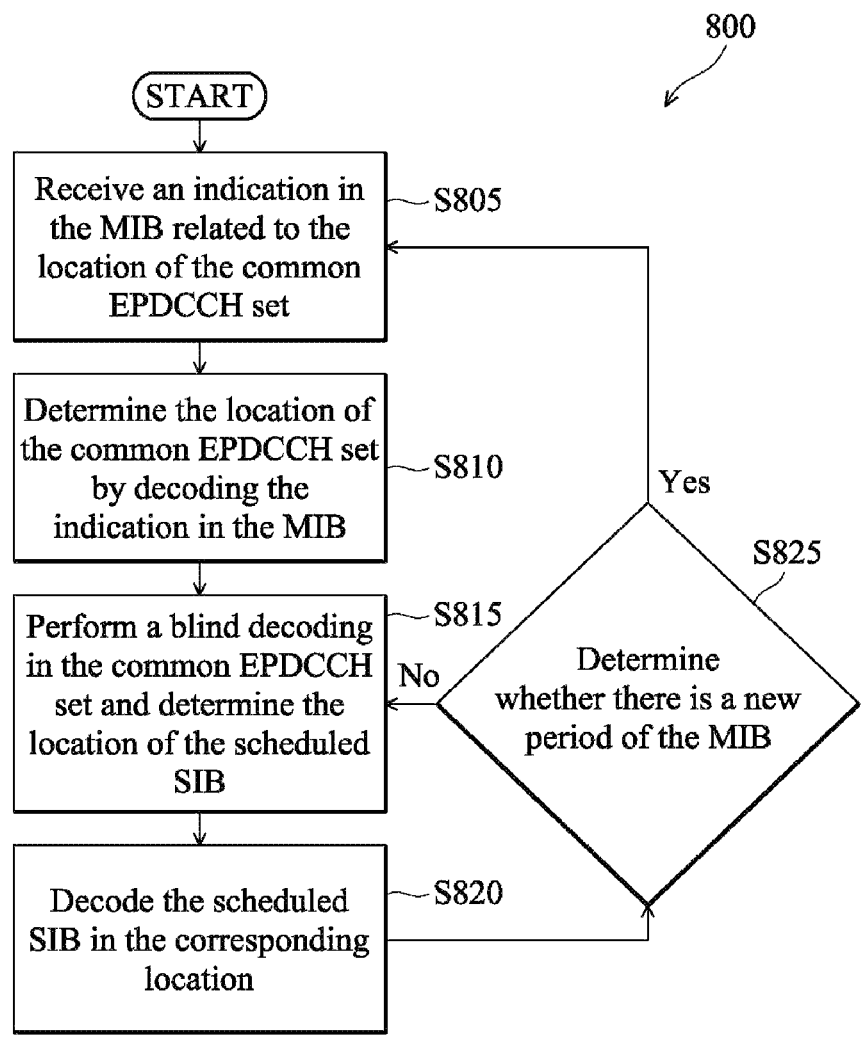
FIG. 8 is a flow diagram illustrating a method for obtaining scheduling information based on the MIB according to the embodiment of the present invention.

FIG. 8 is a flow diagram illustrating a method 800 for obtaining scheduling information based on the MIB according to the embodiment of the present invention. It is noted that the method is performed by a UE. First, the service network transmits the MIB carried by the PBCH to the UE. In step S805, the UE receives an indication in the MIB related to the location of the common EPDCCH set. In step S810, the UE determines the location of the common EPDCCH set by decoding the indication in the MIB. Then, in step S815, the UE performs a blind decoding in the common EPDCCH set and determines the location of the scheduled SIB. In step S820, the UE decodes the scheduled SIB in the corresponding location. In step S825, the UE determines whether there is a new period of the MIB. When the UE determines that the new period of the MIB has arrived, the method returns to step S805. Otherwise, the method returns to step S815. It should be noted that, if there is a configured EPDCCH set(s) for some UEs, the UEs should also perform blind decoding in the configured EPDCCH set(s) for UE-specific scheduling information. After obtaining the UE-specific scheduling information by blind decoding in the configured EPDCCH set(s), the UEs should decode the scheduled UE-specific data in the corresponding location within the data region, or transmit the scheduled UE-specific data in the corresponding location according to the UE-specific scheduling information. If there is no configured EPDCCH set(s) for some UEs, the UEs perform the blind detection in the common EPDCCH set and perform the corresponding procedures.

Direction #3 is a method based on the combination of the MIB and the EPCFICH, wherein the resources for the common EPDCCH set are indicated according to the MIB and the EPCFICH. In Direction #3, the configuration information in the MIB indicates the reserved radio resources for the EPDCCH set, including the size and the additional offset, while the configuration information in the EPCFICH is used to indicate the actually used resources among the reserved resources for the common EPDCCH set. It means that part of the radio resources among the reserved resources are used for the EPDCCH transmission in the common EPDCCH set. In Direction #3, the EPCFICH is used to support a dynamic resource allocation for the common EPDCCH set and reduce the complexity of blind decoding in the common EPDCCH set. It should be noted that, the transmission period of the EPCFICH in Direction #3 is a single subframe, or a couple of subframes. The related EPCFICH configurations are transmitted in the MIB, e.g. periodicity, time-frequency location, etc. However, it should be guaranteed that the periodicity of the MIB must be a multiple of the periodicity of the EPCFICH, otherwise a mismatch may occur between the actually used resources and the reserved radio resources for the common EPDCCH set. Therefore, Direction #3 may also be named as the design method based on the MIB+EPCFICH.

In the Direction #3, the UE obtains the reserved radio resources for the common EPDCCH set by decoding the configurations in the MIB and the EPCFICH, wherein the configuration information indicates the size of radio resources for the common EPDCCH set, the additional offset of the reserved resources, and the actually used resources explicitly or implicitly. Then, the UE can determine the location of the broadcast message, such as SIB, by decoding the scheduling information blindly in the common EPDCCH set. Finally, the scheduled SIB can be decoded in the corresponding position. It should be noted that, the actually used radio resources for the common EPDCCH set changes when a new periodicity of EPCFICH has arrived. To be more precise, the basic configurations of the radio resources for the common EPDCCH set are fixed during one period of the EPCFICH, and the basic configurations of the radio resources for the EPCFICH are fixed during one period of the MIB. The configurations for both the common EPDCCH set and the EPCFICH would change when the new period of the MIB has arrived.

Based on the above discussion, the UE procedure under the Direction #3 may be summarized as
  Step 1: the UE receives the MIB indicating the reserved radio resources for the common EPDCCH set and the EPCFICH.
  Step 2: the UE determines the reserved radio resources of the common EPDCCH set and EPCFICH by decoding the MIB.
  Step 3: the UE decodes the EPCFICH, and obtains the actually used resources for the common EPDCCH set.
  Step 4: the UE performs a blind decoding in the common EPDCCH set and determines the location of the scheduled SIB by decoding the scheduling information of the SIB.
  Step 5: the UE decodes the scheduled SIB in the corresponding location.
Continuation: next periodicity of the MIB and the EPCFICH.
  Perform Step 1~Step 5 if a new period of the MIB has arrived;
  If there is no new period of the MIB
  Perform Step 4~Step 5 if there is no new period of the EPCFICH;
  Perform Step 3~Step 5 if a new period of the EPCFICH has arrived.

Figure 9:
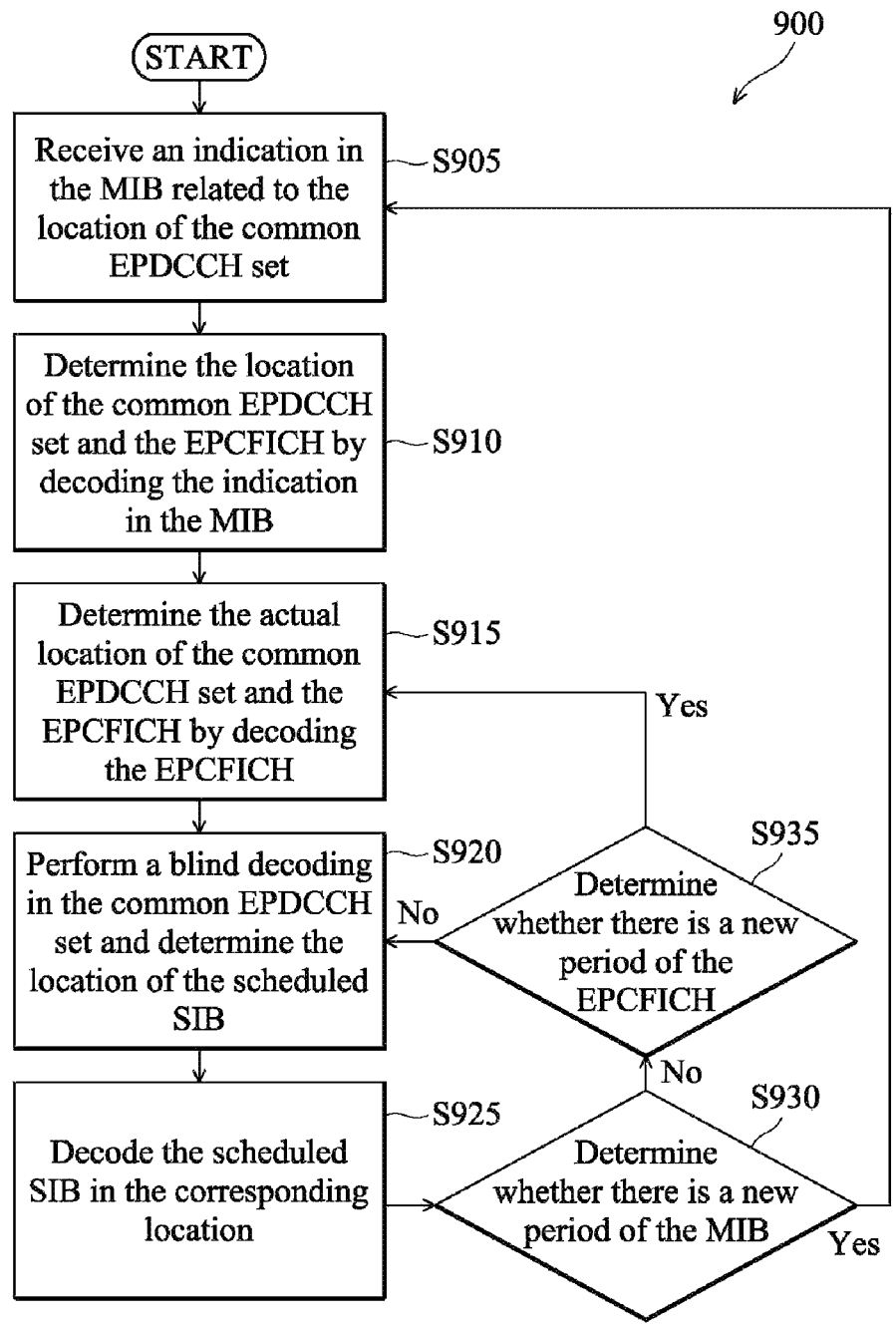
FIG. 9 is a flow diagram illustrating a method for obtaining scheduling information based on the MIB+EPCFICH according to the embodiment of the present invention.

FIG. 9 is a flow diagram illustrating a method 900 for obtaining scheduling information based on the MIB+EPCFICH according to the embodiment of the present invention. It should be noted that the method is performed by UE. First, the service network transmits the MIB carried by the PBCH to the UE. In step S905, the UE receives an indication in the MIB related to the location of the common EPDCCH set. In step S910, the UE determines the location of the common EPDCCH set and the EPCFICH by decoding the indication in the MIB. Then, in step S915, the UE determines the actual location of the common EPDCCH set and the EPCFICH by decoding the EPCFICH. Next, in step S920, the UE performs a blind decoding in the common EPDCCH set and determines the location of the scheduled SIB. In step S925, the UE decodes the scheduled SIB in the corresponding location. In step S930, the UE determines whether there is a new period of the MIB. When the UE determines that the new period of the MIB has arrived, the method returns to step S905. Otherwise, in step S935, the UE determines whether there is a new period of the EPCFICH. When the UE determines that the new period of the EPCFICH has arrived, the method returns to step S915. Otherwise, the method returns to step S920. It should be noted that, if there is a configured EPDCCH set(s) for some UEs, the UEs should also perform the blind decoding in the configured EPDCCH set(s) for UE-specific scheduling information. After obtaining the UE-specific scheduling information by blind decoding in the configured EPDCCH set(s), the UEs should decode the scheduled UE-specific data in the corresponding location within the data region, or transmit the scheduled UE-specific data in the corresponding location according to the UE-specific scheduling information. If there is no configured EPDCCH set(s) for some UEs, the UEs perform the blind detection in the common EPDCCH set and perform the corresponding procedures.

Figure 10A:
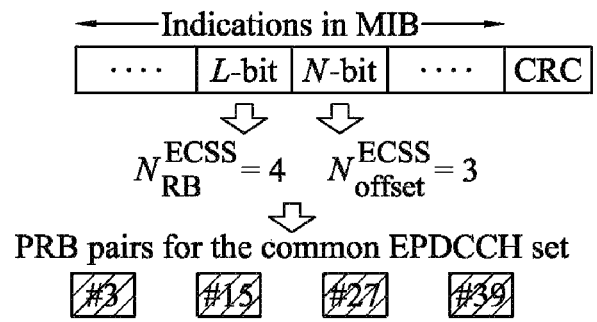
FIGS. 10A~10B are schematic diagrams illustrating two options of indicating the values of the size of reserved resources and the offset for the common EPDCCH set according to one embodiment of the present invention.
Figure 10B:
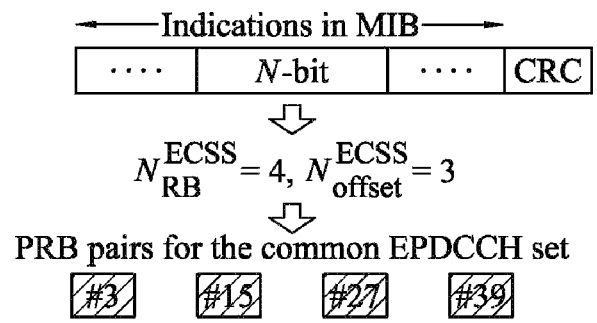

In one embodiment, the size of the reserved radio resources for the common EPDCCH set is expressed as the number of PRB pairs $N_{RB}^{ECSS}$ and the offset is expressed as $N_{offset}^{ECSS}$. In Direction #2 and Direction #3, one key point of supporting the stand-alone operation is how to determine the location of the common EPDCCH set, including the value of $N_{RB}^{ECSS}$ and $N_{RB}^{ECSS}$. One option is to indicate the respective values of the two parameters. In one embodiment, each parameter can be indicated explicitly, implicitly or calculated by a specified rule. Another option is to indicate the values of the two parameters jointly. FIGS. 10A~10B are schematic diagrams illustrating the two options of indicating the values of the size of reserved resources and the offset for the common EPDCCH set according to one embodiment of the present invention. In FIG. 10A, two indicators are used to indicate the values of the size of the resources and the offset explicitly, wherein the offset is based on a basic unit of PRB pair. The UE determines the location of the common EPDCCH set directly by decoding the two indicators. In FIG. 10B, only one indicator is used to indicate the location of the common EPDCCH set.

For better frequency diversity, the radio resources of the common EPDCCH set are distributed over the whole channel bandwidth. To maximize the diversity gain, the reserved PRB pairs are further separated with a certain PRB pair interval. In the embodiment, the value of the PRB pair interval depends on the downlink channel bandwidth and the size of the reserved resources, and a maximum interval can be expressed as $\lfloor N_{RB}^{DL}/N_{RB}^{ECSS} \rfloor$. An exemplary expression used to determine the reserved resources can be obtained as follows:

Index of nth PRB pair=$n \times \lfloor N_{RB}^{DL}/N_{RB}^{ECSS} \rfloor$
$n=0, \ldots, N_{RB}^{ECSS}-1$  Eq. (1), where $N_{RB}^{DL}$ is the PRB pair number of the downlink channel bandwidth.

Figure 11A:
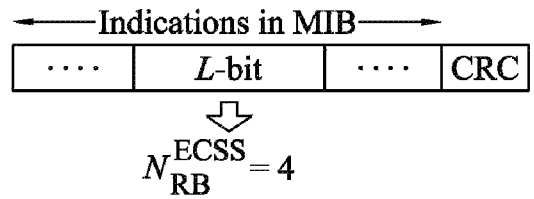
FIGS. 11A~11C are schematic diagrams illustrating three options of indicating the size of reserved radio resources for the common EPDCCH set according to one embodiment of the present invention.
Figure 11B:
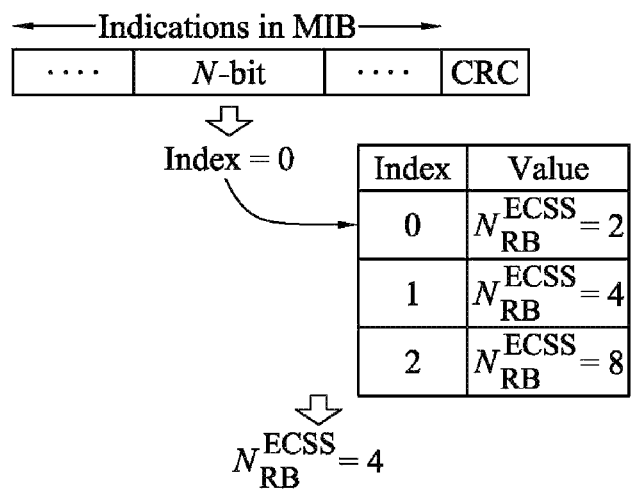
Figure 11C:
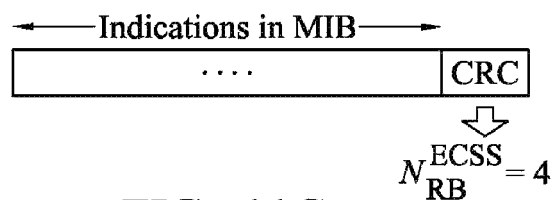

In the embodiment, three possible options are considered to indicate $N_{RB}^{ECSS}$: 1) Option #1, an indicator with one or more than one bit in the MIB is used to indicate the size of the reserved resources for the common EPDCCH set explicitly; 2) Option #2, an indicator with one or more than one bit in the MIB is used to indicate the size of the reserved resources for the common EPDCCH set implicitly; 3) Option #3, a cyclic redundancy check (CRC) parity bits of the MIB is used to indicate the size of the reserved resources for the common EPDCCH set. FIGS. 11A~11C are schematic diagrams illustrating three options of indicating the size of reserved radio resources for the common EPDCCH set according to one embodiment of the present invention. In FIG. 11A, the information of the PRB pair number is obtained from an indicator with L bits in the MIB directly. In FIG. 11B, an indicator with N bits in the MIB indicates an index and the UEs determine the radio resource size of the common EPDCCH set by checking the index in a table, wherein the table determining the radio resource size of the common EPDCCH set is specified. In FIG. 11C, the information of the PRB pair number is indicated by the CRC mask for the CRC of the MIB.

Regarding the indication of the additional offset, there are four possible options to indicate the offset value. Option #1 is to indicate the offset by an indicator in the MIB explicitly. It means that the offset value is obtained from the indicator directly. Option #2 is to indicate the offset value by an indicator in the MIB implicitly, wherein the offset value is derived from the content of the indicator indirectly. Option #3 is to indicate the offset by an indicator in the EPCFICH. Option #4 is to specify a rule to calculate the offset.

In Option #4, if the offset is based on a basic unit of PRB pair, the size of radio resources for the common EPDCCH set and the downlink channel bandwidth are used as the parameters to calculate the offset definitively, since the range of the offset varies with the configuration of the two parameters. If the offset is based on a basic unit of the EREG or the ECCE, the EREG number per ECCE, the EREG number per PRB pair or the ECCE number per PRB pair should be taken into account except for the size of the radio resources of the common EPDCCH set, wherein the PRB pair is the reserved resources for the common EPDCCH set. To be more precise, the cell specific parameters may be included, such as cell ID. The main considerations for supporting the offset of the ECCE/EREG level are discussed above, and are not limited thereto. In the embodiment, the cell ID may be a physical cell ID or a virtual cell ID. Moreover, the subframe index may also be considered to randomize the location of the common EPDCCH set, maximize the diversity gain, randomize the inter-cell interference and support the operation of the ICIC.

Some exemplary expressions used to calculate the offset based on the basic unit of the PRB pair, the ECCE and the EREG are given as follows:

$$\begin{cases} N_{offset}^{ECSS} = (N_{ID}^{cell} + n_{sf}) \bmod \lfloor N_{RB}^{DL}/N_{RB}^{ECSS} \rfloor, & \text{PRB pair level} \\ N_{offset}^{ECSS} = (N_{ID}^{cell} + n_{sf}) \bmod (N_{RB}^{ECSS} * N_{RB}^{ECCE}), & \text{ECCE level} \\ N_{offset}^{ECSS} = (N_{ID}^{cell} + n_{sf}) \bmod \lfloor (N_{RB}^{ECSS} * N_{RB}^{EREG})/N_{ECCE}^{EREG} \rfloor, & \text{EREG level} \end{cases} \quad \text{Eq. (2)}$$

where $N_{ID}^{cell}$ is the physical cell ID, $n_{sf}$ is the subframe index, $N_{RB}^{EREG}$ is the EREG number per PRB pair, $N_{RB}^{ECCE}$ is the ECCE number per PRB pair, and $N_{ECCE}^{EREG}$ is the EREG number per ECCE. According to the embodiment, an expression used to determine the reserved resources based on a basic unit of the PRB pair can be obtained as follows:

Index of nth PRB pair=$n \times \lfloor N_{RB}^{DL}/N_{RB}^{ECSS} \rfloor +$
$(N_{ID}^{cell}+n_{sf}) \bmod \lfloor N_{RB}^{DL}/N_{RB}^{ECSS} \rfloor$  Eq (3).

FIGS. 12A~12D are schematic diagrams illustrating the four examples of indicating the additional offset to the reserved radio resources for the common EPDCCH set according to one embodiment of the present invention. In FIG. 12A, the UE obtains the offset value by decoding the indicator with L bits in the MIB directly. In FIG. 12B, an indicator with N bits in the MIB gives the index and the UE obtains the offset value by checking the index in a table, wherein the configuration table determining the offset to the reserved radio resources for the common EPDCCH set is specified. To be more precise, the value changes with the period of the MIB. In FIG. 12C, an indicator with Q bits in the EPCFICH gives the index and the UE obtains the offset value by checking the index in a table, wherein the table determining the offset to the reserved radio resources for the common EPDCCH set is specified. To be more precise, the value changes with the period of the EPCFICH. In FIG. 12D, the offset value is calculated by a function of the size of the reserved radio resources for the common EPDCCH set $N_{RB}^{ECSS}$, the downlink channel bandwidth $N_{RB}^{DL}$, the physical cell ID $N_{ID}^{cell}$ and the subframe index $n_{sf}$.

In Direction #3, the EPCFICH is used to indicate the size of the actually used resources for the common EPDCCH set dynamically to improve the resource efficiency. One solution is to design an indicator with the size of the reserved radio resources to inform the UE which PRB pairs are used, such as a bit map with $N_{RB}^{ECSS}$ bits. In the solution, the UE may know a more precise size of the used resources for the EPDCCH transmissions according to the configuration in the MIB indicating the reserved resources for the common EPDCCH set. To be more precise, the size of the used resources can vary with the period of the EPCFICH.

Figure 13:
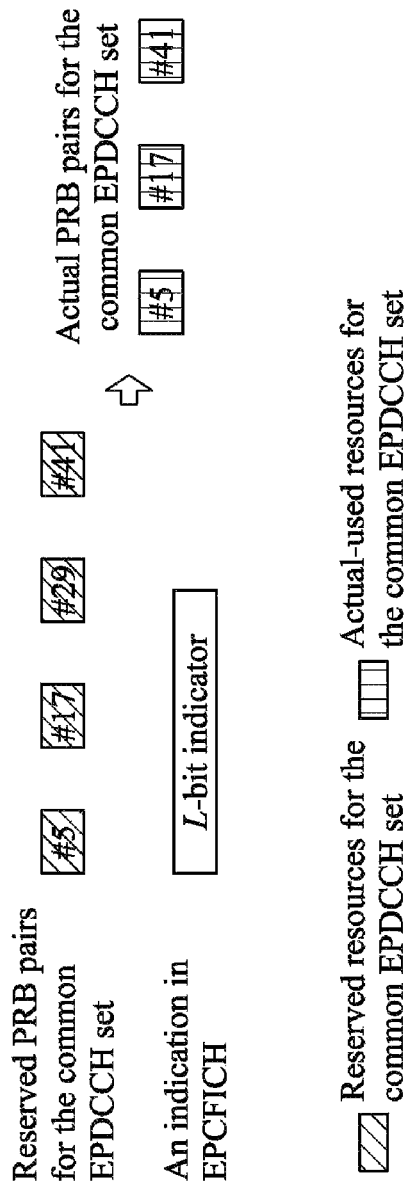
FIG. 13 is a schematic diagram illustrating an example of indicating a dynamic resource allocation for the common EPDCH set according to one embodiment of the present invention.

FIG. 13 is a schematic diagram illustrating an example of indicating a dynamic resource allocation for the common EPDCH set according to one embodiment of the present invention. In the example, an indicator with L bits indicates part of the reserved PRB pairs used for the EPDCCH transmission in the common EPDCCH set.

In Direction #3, another issue is to indicate the location of the EPCFICH to the UE. To consider the signaling overhead and the complexity, two solutions are provided in the invention.

The first solution is that part of the radio resources is reserved for the EPCFICH transmission, wherein another part of the radio resources is used for the common EPDCCH set and in one case the radio resources for EPCFICH could be orthogonal to the radio resources for the common EPDCCH set. The size of the radio resources for the EPCFICH is expressed as the number of the PRB pairs $N_{RB}^{EPCFICH}$. To be more precise, a cell-specific offset $N_{offset}^{EPCFICH}$ added to the reserved resources to perform ICIC and maximize the diversity gain. In the example, the offset can be a frequency offset of the reserved PRB pairs for the EPCFICH, or a logical offset of the minimum resource unit of the EPCFICH, such as the ECCE, the EREG or the radio resource element (RE). The second solution is that part of radio resources is reserved for the EPCFICH, wherein this part of radio resources can be multiplexed with the radio resources for the common EPDCCH set, for example, at least a part of radio resources reserved for the common EPDCCH set could be overlapped with the radio resources for EPCFICH, in other words, partly or fully overlapped with the radio resources for EPCFICH. The size of the radio resources for EPCFICH is determined based on the basic unit of the PRB pairs, the ECCE, the EREG or the RE. For inter-cell interference randomization or coordination, a cell-specific offset, $N_{offset}^{EPCFICH}$, is added to determine the location of the EPCFICH. The offset value is either a frequency or a logical offset and can be determined based on the basic unit of the PRB pairs, the ECCE, the EREG or the RE. In addition, additional signaling or a predefined rule is needed to determine the location of the EPCFICH. For example, if the method related to signaling is used, the configuration of the EPCFICH for the location determination can be indicated in the MIB. If the method related to the predefined rule is used, the location of the EPCFICH can be determined through an equation depending on some physical parameters.

For the offset value, a rule can be predefined for calculation. If the offset is based on the level of the PRB pair, the downlink channel bandwidth or the size of the reserved resources for the common EPDCCH set may be used as the parameters to calculate the offset definitely, since the range of the offset varies with the configuration of the two parameters. If the ECCE, the EREG or the RE is a basic unit for constituting the offset, the ECCE number per PRB pair, the EREG number per ECCE or the RE number per EREG is taken into account. In the example, the resource unit for the EPCFICH depends on the overhead of the EPCFICH. To be more precise, the cell specific parameters may be included, such as the cell ID, to obtain a cell-specific offset for the inter-cell interference randomization or coordination. In the example, the cell ID may be a physical cell ID or a virtual cell ID. Moreover, the subframe index may also be considered to randomize the location of the EPCFICH for maximizing the diversity gain. It should be noted that, not all resources in the reserved PRB pairs are used for EPCFICH if the unit of the reserved radio resources is a PRB pair. A rule can be specified that how to select the resources in the reserved PRB pairs. For example, the first EREG in each reserved PRB pair for the EPCFICH are used for the EPCFICH transmission. The unused resources in the reserved PRB pairs may be used for the transmission of other physical channels, such as the EPDCCH. In the case, a rate matching around the EPCFICH is performed.

Figure 14:
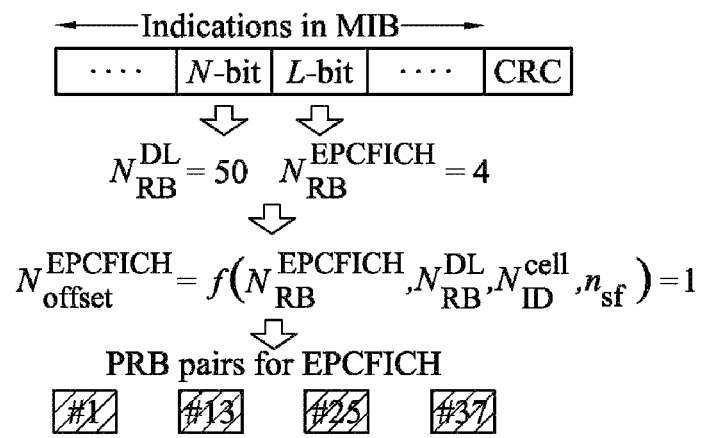
FIG. 14 is a schematic diagram illustrating an example of determining the location of the EPCFICH according to one embodiment of the present invention.

An example used to determine the location of EPCFICH is given as follows:

$$\text{Index of } n\text{th PRB pair} = (n \times \lfloor N_{RB}^{DL}/N_{RB}^{EPCFICH} \rfloor + N_{offset}^{EPCFICH}) \bmod N_{RB}^{DL} \qquad \text{Eq (4)},$$

where $n=0, \ldots, N_{RB}^{EPCFICH}-1$. In the example, the offset is based on a basic unit of the PRB pair level. The offset may be calculated according to an example as follows:

$$\begin{cases} N_{offset}^{EPCFICH} = (N_{ID}^{cell} + n_{sf}) \bmod \lfloor N_{RB}^{DL}/N_{RB}^{EPCFICH} \rfloor, & \text{PRB pair level} \\ N_{offset}^{EPCFICH} = (N_{ID}^{cell} + n_{sf}) \bmod \lfloor (N_{RB}^{EPCFICH} * N_{RB}^{EREG})/N_{ECCE}^{EREG} \rfloor, & \text{EREG level} \\ N_{offset}^{EPCFICH} = (N_{ID}^{cell} + n_{sf}) \bmod N_{RE}^{EPCFICH}, & \text{RE level} \end{cases} \qquad \text{Eq (5)}$$

where $N_{ID}^{cell}$ is the physical cell ID, $n_{sf}$ is the subframe index, $N_{RB}^{EREG}$ is the EREG number per PRB pair, $N_{ECCE}^{EREG}$ is the EREG number per ECCE, $N_{RE}^{EPCFICH}$ is the RE number in the reserved radio resources for the EPCFICH. FIG. 14 is a schematic diagram illustrating an example of determining the location of the EPCFICH according to one embodiment of the present invention. In the example, the UE obtains the subframe index, the downlink channel bandwidth and the size of radio resources for the EPCFICH by decoding the indicators in the MIB. Then, the offset of the resources can be calculated by a function. Finally, the UE determines the location for the EPCFICH.

According to the discussion described above, through combining the solutions to indicate the location of the common EPDCCH set in the method based on a predefined rule, a method based on the MIB, or the locations of the common EPDCCH set and the EPCFICH in the method based on the MIB+EPCFICH, and through considering the complexity at transmitter and receiver end, and the signaling overhead, seven methods are provided according to the proposed methods of Direction #2 and Direction #3 to indicate the size of the reserved radio resources for the common EPDCCH set, the additional offset to the reserved radio resources for the common EPDCCH set, the size of the radio resources for the EPCFICH, the additional offset to the resources for the EPCFICH, and the indicator to indicate the actually used resources for the common EPDCCH set in Direction #3.

In Method #1, an indicator with a certain number of bits in the MIB indicates the size of the reserved radio resources and the additional offset for the common EPDCCH set explicitly. The method is based on the MIB.

In Method #2, an indicator with a certain number of bits in the MIB indicates the size of the reserved radio resources for the common EPDCCH set and the additional offset for the common EPDCCH set implicitly. The method is based on the MIB.

In Method #3, an additional CRC mask for the CRC of the MIB indicates the size of the radio resources for the common EPDCCH set, and an indicator with one or more than one bit in the MIB indicates the additional offset of the reserved resources. The method is based on the MIB.

In Method #4, an indicator with a certain number of bits in the MIB indicates the size of the reserved resources for the common EPDCCH set, and a rule is predefined to calculate the additional offset of the reserved resources. The method is based on the MIB.

In Method #5, an additional CRC mask for the CRC of the MIB indicates the size of the reserved resources for the common EPDCCH set, and a rule is predefined to calculate the additional offset of the reserved resources. The method is based on the MIB.

In Method #6, an indicator with one or more than one bit in the MIB indicates the size of the reserved radio resources for the common EPDCCH set. A rule is predefined to calculate the additional offset of the reserved radio resources. An indicator in the EPCFICH indicates the actually used resources among the reserved radio resources of the common EPDCCH set. To be more precise, an indicator in the MIB indicates the size of the radio resources for the EPCFICH.

A rule is predefined to calculate the additional offset of the resources of the EPCFICH. The method is based on the MIB+EPCFICH.

In Method #7, an additional CRC mask for the CRC of the MIB indicates the size of the reserved radio resources for the common EPDCCH set. A rule is predefined to calculate the additional offset of the radio resources. The EPCFICH indicates the actually used resources among the reserved radio resources for the common EPDCCH set. To be more precise, an indicator in the MIB indicates the size of the radio resources for the EPCFICH. A rule is predefined to calculate the additional offset to the reserved resources of the EPCFICH. The method is based on the MIB+EPCFICH.

Method #1 for the Indication of the Location of the Common EPDCCH Set Under the Design Direction Based on the MIB In the proposed method, different physical resource setting of the common EPDCCH set, including the size of the reserved radio resources, the additional offset of the radio resources and the downlink channel bandwidth are specified in a table. An indicator in the MIB is used to inform the UEs of the size of the reserved radio resources for the common EPDCCH set and the offset of the reserved resources jointly and explicitly. The details of the embodiments are described below.

To reduce the complexity and the signaling overhead, the possible values of $N_{RB}^{ECSS}$ are $\{2, 4, 8\}$. One consideration is that there are 576 REs in 4 RPB pairs, which is equal to 16 control channel elements (CCEs). In a legacy PDCCH, 16 CCEs are reserved for the transmission of the common search space (CSS). When the collision signals are considered, such as CRS, CSI-RS, PSS/SSS and DMRS, the number of available REs in 4 PRB pairs may be less than 16 CCEs. Thus, the search space needs to be extended. As discussed in RAN 1, 2 ECCEs per PRB pair may be applied under some conditions. Therefore, $N_{RB}^{ECSS}=8$ is considered. To be more precise, when the complexity of the blind decoding is considered, a smaller size should be considered in cases with a smaller ECSS. Therefore, $N_{RB}^{ECSS}=2$ is used.

As discussed above, an additional offset $N_{offset}^{ECSS}$ is added to the reserved radio resources based on a basic unit of the PRB pair, the ECCE or the EREG. In the method, the PRB pair based on the offset is considered. Thus, the offset value depends on the bandwidth and the size of the reserved radio resources. To be more precise, the cell ID should be considered to have a cell-specific offset to support ICIC. Moreover, to enable the location of the common EPDCCH set hopping subframe by subframe, or based on a basic unit of a couple of subframes, the physical location of the common EPDCCH set changes with a certain period. In the method, the offset of the reserved resources for the common EPDCCH set changes with the period of the MIB.

An exemplary expression used to determine the reserved radio resources can be expressed as follows:

$$\text{Index of } n\text{th PRB pair} = (n \times \lfloor N_{RB}^{DL}/N_{RB}^{ECSS} \rfloor + N_{offset}^{ECSS}) \bmod N_{RB}^{DL} \quad \text{Eq (6)},$$

where $n=0, \ldots, N_{RB}^{ECSS}-1$, $N_{RB}^{DL}$ is the downlink channel bandwidth in the number of the PRB pairs and the possible values are $\{6, 15, 25, 50, 75, 100\}$ in this example, and $N_{offset}^{ECSS}$ is the offset based on a basic unit of the PRB pair, wherein the range of $N_{offset}^{ECSS}$ is from 0 to $\lfloor N_{RB}^{DL}/N_{RB}^{ECESS} \rfloor$.

According to the proposed values $\{2, 4, 8\}$ for $N_{RB}^{ECSS}$, there are different combinations of the size of the reserved resources and the offset under the cases of different downlink channel bandwidths. Different settings are summarized as follows:

$N_{RB}^{DL}=6$ and $N_{RB}^{ECSS}=2$, the offset based on the PRB pair belongs to an integer and the possible values of the offset are $\{0, 1, 2\}$. Then, an indicator with 2 bits may indicate the offset.

$N_{RB}^{DL}=6$ and $N_{RB}^{ECSS}=4$, the offset based on the PRB pair belongs to an integer and the possible values of the offset are $\{0, 1\}$. Then, an indicator with 1 bit may indicate the offset.

$N_{RB}^{DL}=15$ and $N_{RB}^{ECSS}=2$, the offset based on the PRB pair belongs to an integer and the possible values of the offset are $\{0, 1, 2, 3, 4, 5, 6, 7\}$. Then, an indicator with 3 bits may indicate the offset.

$N_{RB}^{DL}=15$ and $N_{RB}^{ECSS}=4$, the offset based on the PRB pair belongs to an integer and the possible values of the offset are $\{0, 1, 2, 3\}$. Then, an indicator with 2 bits may indicate the offset.

$N_{RB}^{DL}=15$ and $N_{RB}^{ECSS}=8$, the offset based on the PRB pair belongs to an integer and the possible values of the offset are $\{0, 1\}$. Then, an indicator with 1 bit may indicate the offset.

$N_{RB}^{DL}=25$ and $N_{RB}^{ECSS}=2$, the offset based on the PRB pair belongs to an integer and the possible values of the offset are $\{0, 1, 2, \ldots, 12\}$. Then, an indicator with 4 bits may indicate the offset.

$N_{RB}^{DL}=25$ and $N_{RB}^{ECSS}=4$, the offset based on the PRB pair belongs to an integer and the possible values of the offset are $\{0, 1, 2, 3, 4, 5, 6\}$. Then, an indicator with 3 bits may indicate the offset.

$N_{RB}^{DL}=25$ and $N_{RB}^{ECSS}=8$, the offset based on the PRB pair belongs to an integer and the possible values of the offset are $\{0, 1, 2, 3\}$. Then, an indicator with 2 bits may indicate the offset.

$N_{RB}^{DL}=50$ and $N_{RB}^{ECSS}=2$, the offset based on the PRB pair belongs to an integer and the possible values of the offset are $\{0, 1, 2, \ldots, 25\}$. Then, an indicator with 5 bits may indicate the offset.

$N_{RB}^{DL}=50$ and $N_{RB}^{ECSS}=4$, the offset based on the PRB pair belongs to an integer and the possible values of the offset are $\{0, 1, 2, \ldots, 12\}$. Then, an indicator with 4 bits may indicate the offset.

$N_{RB}^{DL}=50$ and $N_{RB}^{ECSS}=8$, the offset based on the PRB pair belongs to an integer and the possible values of the offset are $\{0, 1, 2, 3, 4, 5, 6\}$. Then, an indicator with 3 bits may indicate the offset.

$N_{RB}^{DL}=75$ and $N_{RB}^{ECSS}=2$, the offset based on the PRB pair belongs to an integer and the possible values of the offset are $\{0, 1, 2, \ldots, 37\}$. Then, an indicator with 6 bits may indicate the offset.

$N_{RB}^{DL}=75$ and $N_{RB}^{ECSS}=4$, the offset based on the PRB pair belongs to an integer and the possible values are $\{0, 1, 2, \ldots, 18\}$. Then, an indicator with 5 bits may indicate the offset.

$N_{RB}^{DL}=75$ and $N_{RB}^{ECSS}=8$, the offset based on the PRB pair belongs to an integer and the possible values are $\{0, 1, 2, \ldots, 9\}$. Then, an indicator with 4 bits may indicate the offset.

$N_{RB}^{DL}100$ and $N_{RB}^{ECSS}=2$, the offset based on the PRB pair belongs to an integer and the possible values are $\{0, 1, 2, \ldots, 50\}$. Then, an indicator with 6 bits may indicate the offset.

$N_{RB}^{DL}100$ and $N_{RB}^{ECSS}=4$, the offset based on the PRB pair belongs to an integer and the possible values are $\{0, 1, 2, \ldots, 25\}$. Then, an indicator with 5 bits may indicate the offset.

$N_{RB}^{DL}100$ and $N_{RB}^{ECSS}=8$, the offset based on the PRB pair i belongs to an integer and the possible values are $\{0, 1, 2, \ldots, 12\}$. Then, an indicator with 4 bits may indicate the offset.

It should be noted that, the value of $N_{RB}^{ECSS}$ is different under the cases of different channel bandwidths. For example, $N_{RB}^{ECSS}$ may not be configured as 8 in cases with 1.4 MHz. A size of 4 or 8 PRB pairs may be configured for the ECSS in cases with larger bandwidths. An exemplary rule used to determine the size of the reserved radio resources for the common EPDCCH set under the cases of the different downlink channel bandwidths can be as follows: in cases with $N_{RB}^{DL}<15$, the possible values for $N_{RB}^{ECSS}$ are $\{2, 4\}$; in cases with $10 \leq N_{RB}^{DL}<25$, the possible values for $N_{RB}^{ECSS}$ are $\{2, 4, 8\}$; otherwise, the possible values for $N_{RB}^{ECSS}$ may be 4 and 8.

In the method, one example is that an indicator with 7 bits is used to inform the UE of the size of the reserved resources and the offset value, wherein the proposed possible values of $N_{RB}^{ECSS}$ are supported under the cases of all kinds of downlink channel bandwidths, except that only 2 and 4 are supported in cases with 1.4 MHz. For explanation, the indicator is labeled as $\{a0, a1, a2, a3, a4, a5, a6\}$ in the following paragraphs, wherein the most significant bit is used to indicate $N_{RB}^{ECSS}$ and the least significant bit is used to indicate $N_{offset}^{ECSS}$.

$N_{RB}^{DL}=100/75$ (20 MHz/15 MHz)

Under this configuration, the possible values for $N_{RB}^{ECSS}$ are $\{2, 4, 8\}$. Then, the value of $N_{RB}^{ECSS}$ and $N_{offset}^{ECSS}$ may be obtained by using different combinations $\{a0, a1, a2, a3, a4, a5, a6\}$.

$N_{RB}^{ECSS}=2$ is indicated by $a0=1$, and $N_{offset}^{ECSS}$ is derived from $\{a1, a2, a3, a4, a5, a6\}$. Then, the indicator format in cases where $N_{RB}^{ECSS}=2$ and $N_{RB}^{DL}=100/75$ is $\{1, a1, a2, a3, a4, a5, a6\}$;

$N_{RB}^{ECSS}=4$ is indicated by $a0=0$ and $a1=0$, and $N_{offset}^{ECSS}$ derived from $\{a2, a3, a4, a5, a6\}$. Then, the indicator format in cases where $N_{RB}^{ECSS}=4$ and $N_{RB}^{DL}=100/75$ is $\{0, 0, a2, a3, a4, a5, a6\}$;

$N_{RB}^{ECSS}=8$ is indicated by $a0=0$, $a1=1$ and $a2=1$, and $N_{offset}^{ECSS}$ is derived from $\{a3, a4, a5, a6\}$. Then, the indicator format in cases where $N_{RB}^{ECSS}=8$ and $N_{RB}^{DL}=100/75$ is $\{0, 1, 1, a3, a4, a5, a6\}$.

$N_{RB}^{DL}=50$ (10 MHz)

Under this configuration, the possible values for $N_{RB}^{ECSS}$ are $\{2, 4, 8\}$. Then, the value of $N_{RB}^{ECSS}$ and $N_{offset}^{ECSS}$ may be obtained by using different combinations $\{a0, a1, a2, a3, a4, a5, a6\}$.

$N_{RB}^{ECSS}=2$ is indicated by $a0=1$, and $N_{offset}^{ECSS}$ is derived from $\{a2, a3, a4, a5, a6\}$. Then, the indicator format in cases where $N_{RB}^{ECSS}=2$ and $N_{RB}^{DL}=50$ is $\{1, x, a2, a3, a4, a5, a6\}$, wherein the value of $a1$ may be ignored;

$N_{RB}^{ECSS}=4$ is indicated by $a0=0$ and $a1=0$, and $N_{offset}^{ECSS}$ is derived from $\{a3, a4, a5, a6\}$. Then, the indicator format in cases where $N_{RB}^{ECSS}=4$ and $N=50$ is $\{0, 0, x, a3, a4, a5, a6\}$, wherein the value of $a2$ may be ignored;

$N_{RB}^{ECSS}=8$ is indicated by $a0=0$, $a1=1$ and $a2=1$, and $N_{RB}^{ECSS}$ is derived from $\{a4, a5, a6\}$. Then, the indicator format in cases where $N_{RB}^{ECSS}=8$ and $N_{RB}^{DL}=50$ is $\{0, 1, 1, x, a4, a5, a6\}$, wherein the value of $a3$ may be ignored.

$N_{RB}^{DL}25$ (5 MHz)

Under this configuration, the possible values for $N_{RB}^{ECSS}$ are $\{2, 4, 8\}$. Then, the value of $N_{RB}^{ECSS}$ and $N_{offset}^{ECSS}$ may be obtained by using different combinations $\{a0, a1, a2, a3, a4, a5, a6\}$.

$N_{RB}^{ECSS}=2$ is indicated by $a0=1$, and $N_{offset}^{ECSS}$ is derived from $\{a3, a4, a5, a6\}$. Then, the indicator format in cases where $N_{RB}^{ECSS}=2$ and $N_{RB}^{DL}=25$ is $\{1, x, x, a3, a4, a5, a6\}$, wherein $a2$ and $a3$ may be ignored;

$N_{RB}^{ECSS}=4$ is indicated by $a0=0$ and $a1=0$, and $N_{RB}^{ECSS}$ is derived from $\{a4, a5, a6\}$. Then, the indicator format in cases where $N_{RB}^{ECSS}=4$ and $N=25$ is $\{0, 0, x, x, a4, a5, a6\}$, wherein $a2$ and $a3$ may be ignored;

$N_{RB}^{ECSS}=8$ is indicated by $a0=0$, $a1=1$, $a2=1$, and $N_{offset}^{ECSS}$ is derived from $\{a5, a6\}$. Then, the indicator format in cases where $N_{RB}^{ECSS}=8$ and $N_{RB}^{ECSS}=25$ is $\{0, 1, 1, x, x, a5, a6\}$, wherein $a2$, $a3$ and $a4$ may be ignored.

$N_{RB}^{DL}=15$ (3 MHz)

Under this configuration, the possible values for $N_{RB}^{ECSS}$ are $\{2, 4, 8\}$. Then, the value of $N_{RB}^{ECSS}$ and $N_{offset}^{ECSS}$ may be obtained by using different combinations $\{a0, a1, a2, a3, a4, a5, a6\}$.

$N_{RB}^{ECSS}=2$ is indicated by $a0=1$, and $N_{offset}^{ECSS}$ is derived from $\{a4, a5, a6\}$. Then, the indicator format in cases where $N_{RB}^{ECSS}=2$ and $N_{RB}^{ECSS}=15$ is $\{1, x, x, x, a4, a5, a6\}$, wherein $a1$, $a2$ and $a3$ may be ignored;

$N_{RB}^{ECSS}=4$ is indicated by $a0=0$ and $a1=0$, and $N_{offset}^{ECSS}$ is derived from $\{a5, a6\}$. Then, the indicator format in cases where $N_{RB}^{ECSS}=4$ and $N_{RB}^{DL}=15$ is {0, 0, x, x, x, a5, a6}, wherein a2, a3 and a4 may be ignored;

$N_{RB}^{ECSS}=8$ is indicated by a0=0, a1=0, a2=1, and $N_{offset}^{ECSS}$ is derived from {a6}. Then, the indicator format in cases where $N_{RB}^{ECSS}=8$ and $N_{RB}^{DL}=15$ is {0, 1, 1, x, x, x, a6}, wherein a3, a4 and a5 may be ignored.

$N_{RB}^{DL}=6$ (1.4 MHz)

Under this configuration, the possible values for $N_{RB}^{ECSS}$ are {2, 4}. Then, the value of $N_{RB}^{ECSS}$ and $N_{offset}^{ECSS}$ may be obtained by using different combinations {a0, a1, a2, a3, a4, a5, a6}.

$N_{RB}^{ECSS}=2$ is indicated by a0=1, and $N_{offset}^{ECSS}$ is derived from {a5, a6}. Then, the indicator format in cases where $N_{RB}^{ECSS}=2$ and $N_{RB}^{DL}=6$ is {1, x, x, x, x, a5, a6}, wherein a2, a3 and a4 may be ignored;

$N_{RB}^{ECSS}=4$ is indicated by a0=0 and a1=0, and Ng: is derived from {a6}. Then, the indicator format in cases where $N_{RB}^{ECSS}=4$ and $N_{RB}^{DL}=6$ is {0, 0, x, x, x, x, a6}, wherein a2, a3, a4 and a5 may be ignored.

Table 1 shows the indicator format of the indicator in the MIB according to an embodiment of the present invention. In the embodiment, 3 possible values of $N_{RB}^{ECSS}$ are proposed and supported under the cases of different downlink channel bandwidths, except that only 2 and 4 PRB pairs are supported in cases with 1.4 MHz. In Table 1, "x" in the indicator means that the value of the bit may be ignored.

TABLE 1

| $N_{RB}^{DL}$ | $N_{RB}^{ECSS}$ | Indicator format {a0, a1, a2, a3, a4, a5, a6} |
|---|---|---|
| 6 | 2 | {1, x, x, x, x, a5, a6} |
|   | 4 | {0, 0, x, x, x, x, a6} |
| 15 | 2 | {1, x, x, x, a4, a5, a6} |
|   | 4 | {0, 0, x, x, x, a5, a6} |
|   | 8 | {0, 1, 1, x, x, x, a6} |
| 25 | 2 | {1, x, x, a3, a4, a5, a6} |
|   | 4 | {0, 0, x, x, a4, a5, a6} |
|   | 8 | {0, 1, 1, x, x, a5, a6} |
| 50 | 2 | {1, x, a2, a3, a4, a5, a6} |
|   | 4 | {0, 0, x, a3, a4, a5, a6} |
|   | 8 | {0, 1, 1, x, a4, a5, a6} |
| 75 | 2 | {1, a1, a2, a3, a4, a5, a6} |
|   | 4 | {0, 0, a2, a3, a4, a5, a6} |
|   | 8 | {0, 1, 1, a3, a4, a5, a6} |
| 100 | 2 | {1, a1, a2, a3, a4, a5, a6} |
|   | 4 | {0, 0, a2, a3, a4, a5, a6} |
|   | 8 | {0, 1, 1, a3, a4, a5, a6} |

Another embodiment specifies the supported values for $N_{RB}^{ECSS}$ under the cases of different system bandwidths. In the embodiment, in cases with $N_{RB}^{DL}<10$, the possible values for $N_{RB}^{ECSS}$ are {2, 4}; in cases with $10 \leq N^{DL}<25$, the possible values for $N_{RB}^{ECSS}$ are {2, 4, 8}; otherwise, the possible values for $N_{RB}^{ECSS}$ may be 4 and 8. In the embodiment, an indicator with 6 bits is used to inform the UE the size of the reserved resources and the offset value. For explanation, the indicator is labeled as {a0, a1, a2, a3, a4, a5} in the following paragraphs, wherein the most significant bit is used to indicate $N_{RB}^{ECSS}$ and the least significant bit is used to indicate $N_{offset}^{ECSS}$.

$N_{RB}^{DL}=100, 75, 50, 25$ (20 MHz, 15 MHz, 10 MHz, 5 MHz)

Under this configuration, the possible values for $N_{RB}^{ECSS}$ are {4, 8}. Then, the value of $N_{RB}^{ECSS}$ and $N_{offset}^{ECSS}$ may be obtained by using different combinations {a0, a1, a2, a3, a4, a5}.

$N_{RB}^{ECSS}=4$ is indicated by a0=0, and $N_{offset}^{ECSS}$ is derived from {a1, a2, a3, a4, a5} in cases with 20 MHz or 15 MHz, or is derived from {a2, a3, a4, a5} in cases with 10 MHz, wherein the value of a1 may be ignored, or is derived from {a3, a4, a5} in cases with 5 MHz wherein the value of a1 and a2 may be ignored. Then, the indicator format in cases where $N_{RB}^{ECSS}=4$ and $N_{RB}^{DL}=100, 75, 50, 25$ is {0, a1, a2, a3, a4, a5}, {0, a1, a2, a3, a4, a5}, {0, x, a2, a3, a4, a5}, and {0, x, x, a3, a4, a5};

$N_{RB}^{ECSS}=8$ is indicated by a0=1, and $N_{offset}^{ECSS}$ is derived from {a2, a3, a4, a5} in cases with 20 MHz or 15 MHz, wherein the value of a1 may be ignored, or is derived from {a3, a4, a5} in cases with 10 MHz or 5 MHz, wherein the value of a1 and a2 may be ignored. Then, the indicator format in cases where $N_{RB}^{ECSS}=8$ and $N_{RB}^{DL}=100, 75, 50, 25$ is {1, x, a2, a3, a4, a5}, {1, x, a2, a3, a4, a5}, {1, x, x, a2, a3, a4, a5}, and {1, x, x, a2, a3, a4, a5}.

$N_{RB}^{DL}=15$ (3 MHz)

Under this configuration, the possible values for $N_{RB}^{ECSS}$ are {2, 4, 8}. Then, the value of $N_{RB}^{ECSS}$ and $N_{offset}^{ECSS}$ may be obtained by using different combinations {a0, a1, a2, a3, a4, a5}.

$N_{RB}^{ECSS}=2$ is indicated by a0=1, and $N_{RB}^{ECSS}$ is derived from {a3, a4, a5}. Then, the indicator format in cases where $N_{RB}^{ECSS}=2$ and $N_{RB}^{DL}=15$ is {1, x, x, a3, a4, a5}, wherein a1 and a2 may be ignored;

$N_{RB}^{ECSS}=4$ is indicated by a0=0 and a1=0, and $N_{offset}^{ECSS}$ is derived from {a4, a5}. Then, the indicator format in cases where $N_{RB}^{ECSS}=4$ and $N_{RB}^{DL}=15$ is {0, 0, x, x, a4, a5}, wherein a2 and a3 may be ignored;

$N_{RB}^{ECSS}=8$ is indicated by a0=0, a1=1, a2=1, and $N_{offset}^{ECSS}$ is derived from {a5}. Then, the indicator format in cases where $N_{offset}^{ECSS}$ and $N_{RB}^{DL}=15$ is {0, 1, 1, x, x, a5}, where a2 and a3 and a4 may be ignored.

$N_{RB}^{DL}6$ (1.4 MHz)

Under this configuration, the possible values for $N_{RB}^{ECSS}$ are {2, 4}. Then, the value of $N_{RB}^{ECSS}$ and $N_{offset}^{ECSS}$ may be obtained by different combinations {a0, a1, a2, a3, a4, a5}.

$N_{RB}^{ECSS}=2$ is indicated by a0=1, and $N_{offset}^{ECSS}$ is derived from {a4, a5}. Then, the indicator format in cases where $N_{RB}^{ECSS}=2$ and $N_{RB}^{DL}=6$ is {1, x, x, x, a4, a5}, wherein a1, a2 and a3 may be ignored;

$N_{RB}^{ECSS}=4$ is indicated by a0=0, and $N_{offset}^{ECSS}$ is derived from {a5}. Then, the indicator format in cases where $N_{RB}^{ECSS}=4$ and $N_{RB}^{DL}=6$ is {0, x, x, x, x, a5}, wherein a1, a2, a3, a4 may be ignored.

Table 2 shows the indicator format of the indicator in the MIB according to an embodiment of the present invention. In the embodiment, there are some rules to limit the possible values for $N_{RB}^{ECSS}$ under the cases of different downlink channel bandwidths. In Table 2, "x" in the indicator means that the value of the bit may be ignored.

TABLE 2

| $N_{RB}^{DL}$ | $N_{RB}^{ECSS}$ | Indicator format {a0, a1, a2, a3, a4, a5} |
|---|---|---|
| 6 | 2 | {1, x, x, x, a4, a5} |
|   | 4 | {0, x, x, x, x, a5} |
| 15 | 2 | {1, x, x, a3, a4, a5} |
|   | 4 | {0, 0, x, x, a4, a5} |
|   | 8 | {0, 1, 1, x, x, a5} |
| 25 | 4 | {0, x, x, a3, a4, a5} |
|   | 8 | {1, x, x, a2, a3, a4, a5} |
| 50 | 4 | {0, x, x, a3, a4, a5} |
|   | 8 | {1, x, x, a2, a3, a4, a5} |

TABLE 2-continued

| $N_{RB}^{DL}$ | $N_{RB}^{ECSS}$ | Indicator format {a0, a1, a2, a3, a4, a5} |
|---|---|---|
| 75 | 4 | {0, a1, a2, a3, a4, a5} |
|  | 8 | {1, x, a2, a3, a4, a5} |
| 100 | 4 | {0, a1, a2, a3, a4, a5} |
|  | 8 | {1, x, a2, a3, a4, a5} |

Figure 15:
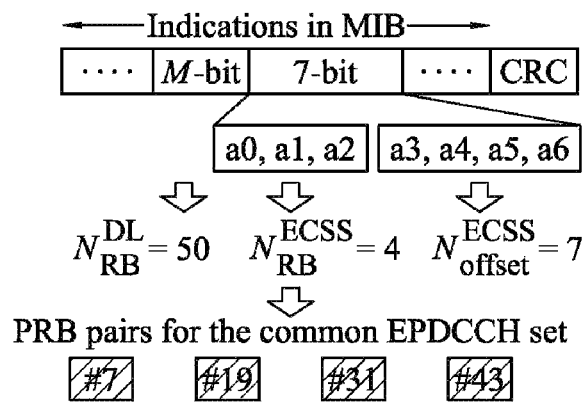
FIG. 15 is a schematic diagram illustrating an example of the location determination for the common EPDCCH set under the case of $N_{RB}^{DL}=50$, $N_{RB}^{ECSS}=4$ and $N_{offset}^{ECSS}=7$ in the proposed method #1 according to one embodiment of the present invention.

FIG. 15 is a schematic diagram illustrating an example of the location determination for the common EPDCCH set in cases where $N_{RB}^{DL}$=50, $N_{RB}^{ECSS}$=4 and $N_{RB}^{ECSS}$=7 in the proposed method #1 according to one embodiment of the present invention. In FIG. 15, the UE first decodes the indicator for the downlink channel bandwidth. Then, the UE decodes the first 3 bits and the remaining 4 bits in the indicator to obtain the size of the radio resources and the additional offset respectively by using the specification in Table 1. In the example, an indicator with 7 bits is given according to Table 1, wherein the possible values for $N_{RB}^{ECSS}$ has no limitation, i.e., 3 values for $N_{RB}^{ECSS}$ are the proposed and supported when the number of the downlink PRB pairs are larger than 10. An indicator with 6 bits shown in Table 2 may also be used, wherein the possible values for $N_{RB}^{ECSS}$ may have a specific limitation.

Method #2 for the Indication of the Location of the Common EPDCCH Set Under the Design Direction Based on the MIB In the proposed method, different physical resource settings of the common EPDCCH set, including the size of reserved radio resources, the offset of the reserved radio resources and the downlink channel bandwidth are specified and indexed in a table. An indicator in the MIB is used to inform the UE of the index of a specific physical setting, which determines the location of the common EPDCCH set. The details of the embodiments are described below.

To reduce the complexity and the signaling overhead, the possible values of $N_{RB}^{ECSS}$ are {2, 4, 8}. One consideration is that there are 576 REs in 4 RPB pairs, which is equal to 16 CCEs. In a legacy PDCCH, 16 CCEs are reserved for the transmission of the CSS. When the collision signals are considered, such as CRS, CSI-RS, PSS/SSS and DMRS, the number of available REs in 4 PRB pairs may be less than 16 CCEs. Then, the search space needs to be extended. As discussed in RAN 1, 2 ECCEs per PRB pair can be applied under some conditions. Therefore, $N_{RB}^{ECSS}$=8 is considered. To be more precise, when the complexity of the blind decoding is considered, a smaller size should be considered in cases with a smaller ECSS. Therefore, $N_{RB}^{ECSS}$=2 is used.

As discussed above, an additional offset $N_{offset}^{ECSS}$ added to the reserved radio resources based on a basic unit of the PRB pair, the ECCE or the EREG. In the method, the PRB pair based on the offset is considered. Thus, the offset value depends on the bandwidth and the size of the reserved radio resources for the common EPDCCH set. To be more precise, the cell ID should be considered to have a cell-specific offset to support the ICIC. Moreover, the location of the common EPDCCH set may be used to hop with a period to randomize the inter-cell interference. The period can be a subframe, or a basic unit of a couple of subframes. In the method, the offset value changes with the period of the MIB.

An exemplary expression used to determine the reserved radio resources can be expressed as follows:

$$\text{Index of } n\text{th PRB pair} = (n \times \lfloor N_{RB}^{DL}/N_{RB}^{ECSS} \rfloor + N_{offset}^{ECSS}) \bmod N_{RB}^{DL} \qquad \text{Eq (7)},$$

where n=0, . . . , $N_{RB}^{ECSS}$−1, $N_{RB}^{DL}$ is the downlink channel bandwidth in the number of the PRB pairs and the possible values are {6, 15, 25, 50, 75, 100}, and $N_{offset}^{ECSS}$ is the offset on a basic unit of the PRB pair, wherein the range of $N_{offset}^{ECSS}$ is from $\lfloor N_{RB}^{DL}/N_{RB}^{ECSS} \rfloor$.

According to the proposed values {2, 4, 8} for $N_{RB}^{ECSS}$, there are different combinations of the size of the reserved resources and the offset under the cases of different downlink channel bandwidths. Different settings for the location of the common EPDCCH set can be summarized as follows:

$N_{RB}^{DL}$=6 and $N_{RB}^{ECSS}$=2, the offset based on the PRB pair belongs to an integer and the possible values are {0, 1, 2};

$N_{RB}^{DL}$=6 and $N_{RB}^{ECSS}$=4, the offset based on the PRB pair belongs to an integer and the possible values are {0, 1};

$N_{RB}^{DL}$=15 and $N_{RB}^{ECSS}$=2, the offset based on the PRB pair belongs to an integer and the possible values are {0, 1, 2, 3, 4, 5, 6, 7};

$N_{RB}^{DL}$=15 and $N_{RB}^{ECSS}$=4, the offset based on the PRB pair belongs to an integer and the possible values are {0, 1, 2, 3};

$N_{RB}^{DL}$=15 and $N_{RB}^{ECSS}$=8, the offset based on the PRB pair belongs to an integer and the possible values are {0, 1};

$N_{RB}^{DL}$=25 and $N_{RB}^{ECSS}$=4, the offset based on the PRB pair belongs to an integer and the possible values are {0, 1, 2, 3, 4, 5, 6};

$N_{RB}^{DL}$=25 and $N_{RB}^{ECSS}$=8, the offset based on the PRB pair belongs to an integer and the possible values are {0, 1, 2, 3};

$N_{RB}^{DL}$=50 and $N_{RB}^{ECSS}$=4, the offset based on the PRB pair belongs to an integer and the possible values are {0, 1, 2, . . . , 12};

$N_{RB}^{DL}$=50 and $N_{RB}^{ECSS}$=8, the offset based on the PRB pair belongs to an integer and the possible values are {0, 1, 2, 3, 4, 5, 6};

$N_{RB}^{DL}$=75 and $N_{RB}^{ECSS}$=4, the offset based on the PRB pair belongs to an integer and the possible values are {0, 1, 2, . . . , 18};

$N_{RB}^{DL}$=75 and $N_{RB}^{ECSS}$=8, the offset based on the PRB pair belongs to an integer and the possible values are {0, 1, 2, . . . , 9};

$N_{RB}^{DL}$=100 and $N_{RB}^{ECSS}$=4, the offset based on the PRB pair belongs to an integer and the possible values are {0, 1, 2, . . . , 25};

$N_{RB}^{DL}$=100 and $N_{RB}^{ECSS}$=8, the offset based on the PRB pair belongs to an integer and the possible values are {0, 1, 2, . . . , 12}.

Under the cases of different bandwidths, the value of $N_{RB}^{ECSS}$ is different. For example, $N_{RB}^{ECSS}$ may not be configured as 8 in cases with 1.4 MHz. A size of 4 or 8 PRB pairs may be configured for the ECSS in cases with larger bandwidths. An exemplary rule used to determine the size under the cases of different downlink channel bandwidths can be as follows: in cases with $N_{RB}^{DL}$<10, the possible values for $N_{RB}^{ECSS}$ are {2, 4}; in cases with 10≤$N_{RB}^{DL}$<25, the possible values for $N_{RB}^{ECSS}$ are {2, 4, 8}; otherwise, the possible values for $N_{RB}^{ECSS}$ may be 4 and 8.

Table 3 shows an example of indexing the physical settings of the common EPDCCH set. As shown in Table 3, an indicator with 7 bits can inform the index of the physical setting and the UEs can determine the location of the common EPDCCH set by checking the index in Table 3. For example, when the value of the indicator in the MIB is 25, the UE may know that 4 PRB pairs are reserved for the common EPDCCH set, the offset value is 5, and the location of the common EPDCCH set is the PRB pairs {#5, #11, #17, #23}.

TABLE 3

| Index | Physical resource settings of the common EPDCCH set |
|---|---|
| 0 | $N_{RB}^{DL} = 6$, $N_{RB}^{ECSS} = 2$, $N_{offset}^{ECSS} = 0$, PRB pair {#0, #3} |
| 1 | $N_{RB}^{DL} = 6$, $N_{RB}^{ECSS} = 2$, $N_{offset}^{ECSS} = 1$, {#1, #4} |
| 2 | $N_{RB}^{DL} = 6$, $N_{RB}^{ECSS} = 2$, $N_{offset}^{ECSS} = 2$, PRB pair {#2, #5} |
| 3 | $N_{RB}^{DL} = 6$, $N_{RB}^{ECSS} = 4$, $N_{offset}^{ECSS} = 0$, PRB pair {#0, #1, #2, #3} |
| 4 | $N_{RB}^{DL} = 6$, $N_{RB}^{ECSS} = 4$, $N_{offset}^{ECSS} = 1$, PRB pair {#1, #2, #3, #4} |
| 5 | $N_{RB}^{DL} = 15$, $N_{RB}^{ECSS} = 2$, $N_{offset}^{ECSS} = 0$, PRB pair {#0, #7} |
| 7 | $N_{RB}^{DL} = 15$, $N_{RB}^{ECSS} = 2$, $N_{offset}^{ECSS} = 1$, PRB pair {#1, #8} |
| . . . | . . . |
| 12 | $N_{RB}^{DL} = 15$, $N_{RB}^{ECSS} = 2$, $N_{offset}^{ECSS} = 7$, PRB pair {#7, #14} |
| 13 | $N_{RB}^{DL} = 15$, $N_{RB}^{ECSS} = 4$, $N_{offset}^{ECSS} = 0$, PRB pair {#0, #3, #6, #9} |
| 14 | $N_{RB}^{DL} = 15$, $N_{RB}^{ECSS} = 4$, $N_{offset}^{ECSS} = 1$, PRB pair {#1, #4, #7, #10} |
| . . . | . . . |
| 17 | $N_{RB}^{DL} = 15$, $N_{RB}^{ECSS} = 8$, $N_{offset}^{ECSS} = 0$, PRB pair {#0, #1, #2, #3, #4, #5, #6, #7} |
| 18 | $N_{RB}^{DL} = 15$, $N_{RB}^{ECSS} = 8$, $N_{offset}^{ECSS} = 1$, PRB pair {#1, #2, #3, #4, #5, #6, #7, #8} |
| . . . | . . . |
| 25 | $N_{RB}^{DL} = 25$, $N_{RB}^{ECSS} = 4$, $N_{offset}^{ECSS} = 6$, PRB pair {#6, #12, #18, #24} |
| 26 | $N_{RB}^{DL} = 25$, $N_{RB}^{ECSS} = 8$, $N_{offset}^{ECSS} = 0$, PRB pair {#0, #3, #6, #9, #12, #15, #18, #21} |
| . . . | . . . |
| 29 | $N_{RB}^{DL} = 25$, $N_{RB}^{ECSS} = 8$, $N_{offset}^{ECSS} = 3$, PRB pair {#3, #6, #9, #12, #15, #18, #21, #24} |
| 30 | $N_{RB}^{DL} = 50$, $N_{RB}^{ECSS} = 4$, $N_{offset}^{ECSS} = 0$, PRB pair {#0, #12, #24, #36} |
| . . . | . . . |
| 42 | $N_{RB}^{DL} = 50$, $N_{RB}^{ECSS} = 4$, $N_{offset}^{ECSS} = 12$, PRB pair {#12, #24, #36, #48} |
| 43 | $N_{RB}^{DL} = 50$, $N_{RB}^{ECSS} = 8$, $N_{offset}^{ECSS} = 0$, PRB pair {#0, #6, #12, #18, #24, #30, #36, #42} |
| . . . | . . . |
| 49 | $N_{RB}^{DL} = 50$, $N_{RB}^{ECSS} = 8$, $N_{offset}^{ECSS} = 6$, PRB pair {#6, #12, #18, #24, #30, #36, #42, #48} |
| 50 | $N_{RB}^{DL} = 100$, $N_{RB}^{ECSS} = 4$, $N_{offset}^{ECSS} = 0$, PRB pair {#0, #25, #50, #75} |
| . . . | . . . |
| 74 | $N_{RB}^{DL} = 100$, $N_{RB}^{ECSS} = 4$, $N_{offset}^{ECSS} = 24$, PRB pair {#24, #49, #74, #99} |
| 75 | $N_{RB}^{DL} = 100$, $N_{RB}^{ECSS} = 8$, $N_{offset}^{ECSS} = 0$, PRB pair {#0, #12, #24, #36, #48, #60, #72, #84} |
| . . . | . . . |
| 87 | $N_{RB}^{DL} = 100$, $N_{RB}^{ECSS} = 8$, $N_{offset}^{ECSS} = 12$, PRB pair {#12, #24, #36, #48, #60, #72, #84, #96} |

Figure 16:
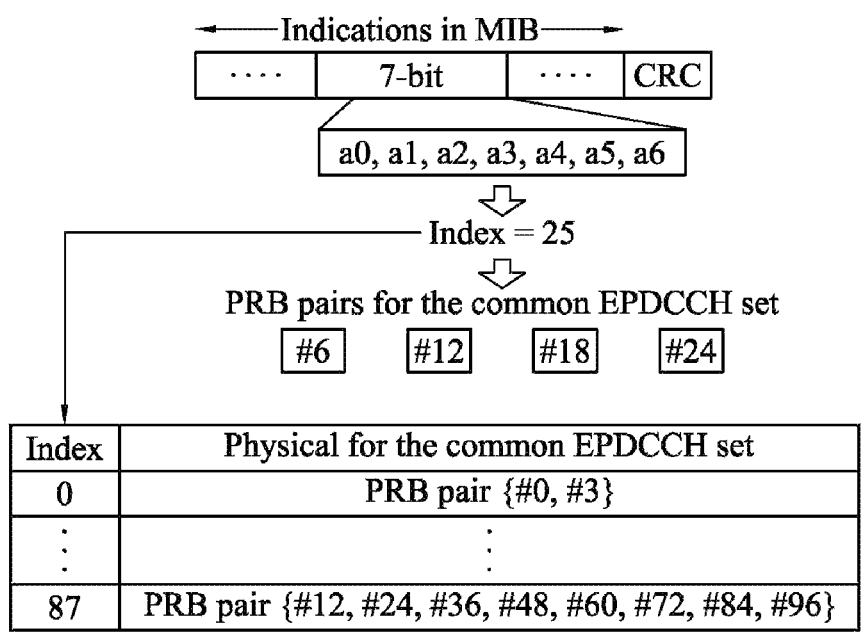
FIG. 16 is a schematic diagram illustrating an example of determining the location of the common EPDCCH set under the case of $N_{RB}^{DL}=50$, $N_{RB}^{ECSS}=4$ and $N_{offset}^{ECSS}=7$ in the proposed method #2 according to one embodiment of the present invention.

FIG. 16 is a schematic diagram illustrating an example of determining the location of the common EPDCCH set under case of $N_{RB}^{DL}=50$, $N_{RB}^{ECSS}=4$ and $N_{RB}^{ECSS}=7$ in the proposed method #2 according to one embodiment of the present invention. In FIG. 16, the UE obtains the index of a specific setting by decoding the indicator in the MIB. Then, the UE determines the location of the common EPDCCH set by using the specification in Table 3.

Method #3 for the Indication of the Location of the Common EPDCCH Set Under the Design Direction Based on the MIB In the proposed method, different formats of a new additional CRC mask for the CRC of the MIB are specified. A CRC mask for the CRC of the MIB is used to inform of the UE the size of the radio resources for the common EPDCCH set. To be more precise, an indicator with a certain number of bits in the MIB is used to indicate the offset to the reserved radio resources. The details of the embodiments are described below.

To reduce the complexity and the signaling overhead, the possible values of $N_{RB}^{ECSS}$ are {2, 4, 8}. One consideration is that there are 576 REs in 4 RPB pairs, which is equal to 16 CCEs. In the legacy PDCCH, 16 CCEs are reserved for the transmission of the CSS. When the collision signals is considered, such as CRS, CSI-RS, PSS/SSS and DMRS, the number of available REs within 4 PRB pairs may be less than 16 CCEs. Then, the search space needs to be extended. As discussed in RAN 1, 2 ECCEs per PRB pair can be applied under some conditions. Therefore, $N_{RB}^{ECSS}=8$ is considered. To be more precise, when the complexity of the blind decoding is considered, a smaller size should be considered in cases with a smaller ECSS. Therefore, $N_{RB}^{ECSS}=2$ is used.

As discussed above, an additional offset $N_{offset}^{ECSS}$ added to the reserved radio resources on a basic unit of the PRB pair, the ECCE or the EREG. In the method, the PRB pair based on the offset is considered. Thus, the offset value depends on the bandwidth and the size of the reserved radio resources for the common EPDCCH set. To be more precise, the cell ID should be considered to have a cell-specific offset to support the ICIC. Moreover, the location of the common EPDCCH set may be used to hop with a period to randomize the inter-cell interference. The period can be a subframe or a basic unit of a couple of subframes. In the method, the offset value changes with the period of the MIB.

An exemplary expression used to determine the reserved radio resources can be expressed as follows:

$$\text{Index of } n\text{th PRB pair} = (n \times \lfloor N_{RB}^{DL}/N_{RB}^{ECSS} \rfloor + N_{offset}^{ECSS}) \bmod N_{RB}^{DL} \quad \text{Eq (8)},$$

where n=0, . . . , $N_{RB}^{ECSS}-1$, $N_{RB}^{DL}$ is the downlink channel bandwidth in the number of the PRB pairs and the possible values are {6, 15, 25, 50, 75, 100}, and $N_{offset}^{ECSS}$ is the offset on a basic unit of the PRB pair, wherein the range of $N_{offset}^{ECSS}$ is from $\lfloor N_{RB}^{DL}/N_{RB}^{ECSS} \rfloor$.

In the method, a new CRC mask for the CRC of MIB is used to indicate the size of the reserved resources for the common EPDCCH set, and different masks correspond to different values of $N_{RB}^{ECSS}$. Then, the UE may obtain the size of the radio resources by decoding the CRC mask blindly. Table 4 shows an example for the additional CRC mask. As shown in Table 4, the CRC mask is denoted as {x0, x1, . . . , x15} for explanation. Different formats for the CRC masks may be defined to indicate $N_{RB}^{ECSS}$, and may not reduce a performance of the PBCH.

TABLE 4

| $N_{RB}^{ECSS}$ | CRC mask {x0, x1, . . . , x15} |
|---|---|
| 2 | {0, 0, 0, 0, 0, 0, 0, 0, 0, 0, 0, 0, 0, 0, 0, 0} |
| 4 | {0, 0, 0, 0, 1, 1, 1, 1, 1, 1, 1, 1, 0, 0, 0, 0} |
| 8 | {1, 1, 1, 1, 0, 0, 0, 0, 0, 0, 0, 0, 1, 1, 1, 1} |

Regarding the additional offset, the range of the additional offset varies with the size of the reserved radio resources for the common EPDCCH set and the downlink channel bandwidth. It is assumed that the proposed possible values for $N_{RB}^{ECSS}$ are supported under the cases of all downlink channel bandwidths, except that only 2 and 4 are supported in cases with 1.4 MHz, the maximum value of the offset can be obtained in cases with $N_{RB}^{DL}$=100 and $N_{RB}^{ECSS}$=2 and the range of the offset is 0~50. In one example, an indicator with 6 bits in the MIB is used to indicate the value under the assumption. For explanation, the indicator is denoted as {a0, a1, a2, a3, a4, a5}.

If some rules are specified for the values of $N_{RB}^{ECSS}$ under different configurations of the downlink channel bandwidth, the range of the offset may be different. For example, in cases with $N_{RB}^{DL}$<10, the possible values for $N_{RB}^{ECSS}$ are {2, 4}; in cases with 10≤$N_{RB}^{DL}$<25, the possible values for $N_{RB}^{ECSS}$ are {2, 4, 8}; otherwise, the possible values for $N_{RB}^{ECSS}$ may be 4 and 8. Then, the range of the additional offset is from 0 to 25. Under the imitation, an indicator with 5 bits is used to indicate the offset value. For explanation, the indicator is denoted as {a0, a1, a2, a3, a4}.

Figure 17:
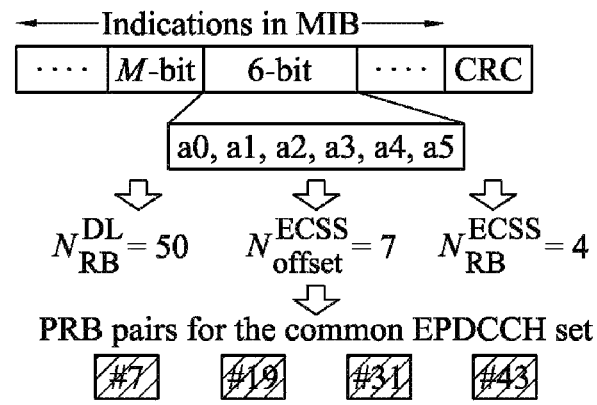
FIG. 17 is a schematic diagram illustrating an example of determining the location of the common EPDCCH set under the case of $N_{RB}^{DL}=50$, $N_{RB}^{ECSS}=4$ and $N_{offset}^{ECSS}=7$ in the proposed method #3 according to one embodiment of the present invention.

FIG. 17 is a schematic diagram illustrating an example of determining the location of the common EPDCCH set in cases where $N_{RB}^{DL}$=50, $N_{RB}^{ECSS}$=4 and $N_{offset}^{ECSS}$=7 in the proposed method #3 according to one embodiment of the present invention. In FIG. 17, the UE obtains the size of the reserved radio resources for the common EPDCCH set by decoding the CRC mask blindly. Then, the UE determines the location of the common EPDCCH set after decoding the indicators in the MIB for the downlink channel bandwidth and the offset values. It is assumed that the size of the radio resources and the downlink channel bandwidth have no specific limitation, an indicator with 6 bits is applied in the example. If there is a rule for the size of the radio resources and the downlink channel bandwidth, such as the rules described above, an indicator with 5 bits should be used.

Method #4 for the Indication of the Location of the Common EPDCCH Set Under the Design Direction Based on the MIB In the proposed method, different sizes of the reserved radio resources for the common EPDCCH set are specified and indexed in a table. An indicator in the MIB is used to inform the UE the index of a size. To be more precise, a rule is predefined to calculate the additional offset of the reserved resources. The details of the embodiments are described below.

To reduce the complexity and the signaling overhead, the possible values of $N_{RB}^{ECSS}$ are {2, 4, 8}. One consideration is that there are 576 REs in 4 RPB pairs, which is equal to 16 CCEs. In the legacy PDCCH, 16 CCEs are reserved for the transmission of the CSS. When the collision signals is considered, such as CRS, CSI-RS, PSS/SSS and DMRS, the number of available REs within 4 PRB pairs may be less than 16 CCEs. Then, the search space needs to be extended. As discussed in RAN 1, 2 ECCEs per PRB pair can be applied under some conditions. Therefore, $N_{RB}^{ECSS}$=8 is considered. To be more precise, when the complexity of the blind decoding is considered, a smaller size should be considered in cases with a smaller ECSS. Therefore, $N_{RB}^{ECSS}$=2 is used.

As discussed above, an additional offset $N_{offset}^{ECSS}$ added to the reserved radio resources based on a basic unit of the PRB pair, the ECCE or the EREG. In the method, a predefined rule is proposed to calculate a PRB-level offset. The offset value depends on the bandwidth and the size of the reserved radio resources for the common EPDCCH set. To be more precise, the cell ID should be considered to have a cell-specific offset to support the ICIC. Moreover, to enable the location of the common EPDCCH set hopping subframe by subframe, or based on a basic unit of a couple of subframes, the subframe index is used to calculate the additional offset. If the offset value changes with a couple of subframes, the subframe index used to calculate the offset can be the index of one subframe in the period. In the method, it is assumed that the offset value changes subframe by subframe. One example used to calculate the offset can be expressed as follows:

$$N_{offset}^{ECSS} = (N_{ID}^{cell} + n_{sf}) \bmod \lfloor N_{RB}^{DL}/N_{RB}^{ECSS} \rfloor \qquad \text{Eq (9)},$$

where $N_{ID}^{cell}$ is the physical cell ID, $n_{sf}$ is the subframe index, $N_{RB}^{DL}$ is the downlink channel bandwidth and the possible values of $N_{RB}^{DL}$ are {6, 15, 25, 50, 75, 100}, and $N_{RB}^{ECSS}$ is the ECCE number per PRB pair.

Then, an exemplary expression used to determine the location of the common EPDCCH set can be expressed as follows:

$$\text{Index of } n\text{th PRB pair} = (n \times \lfloor N_{RB}^{DL}/N_{RB}^{ECSS} \rfloor + (N_{ID}^{cell} + n_{sf}) \bmod \lfloor N_{RB}^{DL}/N_{RB}^{ECSS} \rfloor) \bmod N_{RB}^{DL} \qquad \text{Eq(10)},$$

where n=0, . . . , $N_{RB}^{ECSS}$−1, and $N_{RB}^{DL}$ is the downlink channel bandwidth and the possible values of $N_{RB}^{DL}$ are {6, 15, 25, 50, 75, 100}.

In the method, the possible values for $N_{RB}^{ECSS}$ are {2, 4, 8}. One possible solution is to indicate the value explicitly by an indicator. Thus, an indicator with 3 bits in the MIB may be used to indicate the exact value of the resource size. Another solution is to indicate the value implicitly by specifying a table, wherein different indices indicate different sizes of the reserved radio resources. Thus, an indicator with 2 bits in the MIB may be used to inform of the UE the index. In the method, the latter solution is applied. Table 5 shows an example of indicating the size of the reserved radio resources by the different indices. For explanation, the indicator is noted as {a0, a1}. It should be noted that, the value of the size depends on the downlink channel bandwidth. For example, in cases with $N_{RB}^{DL}$<10, the possible values for $N_{RB}^{ECSS}$ are {2, 4}; in cases with 10≤$N_{RB}^{DL}$<25, the possible values for $N_{RB}^{ECSS}$ are {2, 4, 8}; otherwise, the possible values for $N_{RB}^{ECSS}$ may be 4 and 8.

TABLE 5

| Index | Value |
|---|---|
| 0 | 2 |
| 1 | 4 |
| 2 | 8 |

Figure 18:
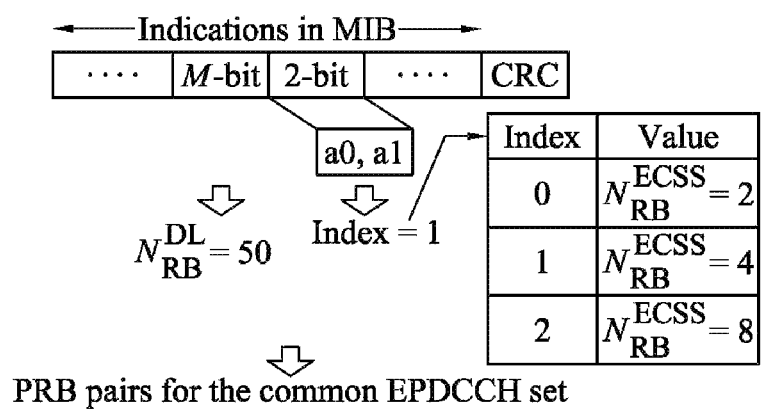
FIG. 18 is a schematic diagram illustrating an example of determining the location of the common EPDCCH set under the case of $N_{RB}^{DL}=50$, $N_{RB}^{ECSS}=4$ and $N_{ID}^{cell}=3$ and $n_{sf}=0$ in the proposed method #4 according to one embodiment of the present invention.

FIG. 18 is a schematic diagram illustrating an example of determining the location of the common EPDCCH set in cases where $N_{RB}^{DL}$=50, $N_{RB}^{ECSS}$=4, $N_{ID}^{cell}$=3 and $n_{sf}$=0 proposed method #4 according to one embodiment of the present invention. In FIG. 18, the UE obtains the index signaled by the indicator in the MIB and determines the size of the reserved radio resources for the common EPDCCH set by checking the index table. Then, the UE calculates the offset value based on the available parameters and determines the location of the common EPDCCH set finally.

Method #5 for the Indication of the Location of the Common EPDCCH Set Under the Design Direction Based on the MIB In the proposed method, different formats of a new additional CRC mask for the CRC of the MIB are specified. A CRC mask for the CRC of the MIB is used to inform the UE the size of the reserved radio resources. To be more precise, a rule is predefined to calculate an additional offset of the reserved radio resources. The details of the embodiments are described below.

To reduce the complexity and the signaling overhead, the possible values of $N_{RB}^{ECSS}$ are {2, 4, 8}. One consideration is that there are 576 REs in 4 RPB pairs, which is equal to 16 CCEs. In the legacy PDCCH, 16 CCEs are reserved for the transmission of the CSS. When the collision signals is considered, such as CRS, CSI-RS, PSS/SSS and DMRS, the number of available REs within 4 PRB pairs will be less than 16 CCEs. Then, the search space needs to be extended. As discussed in RAN 1, 2 ECCEs per PRB pair can be applied under some conditions. Therefore, $N_{RB}^{ECSS}=8$ is considered. To be more precise, when the complexity of the blind decoding is considered, a smaller size should be considered in cases with a smaller ECSS. Therefore, $N_{RB}^{ECSS}=2$ is used.

As discussed above, an additional offset $N_{offset}^{ECSS}$ is added to the reserved radio resources based on a basic unit of the PRB pair, the ECCE or the EREG. In the method, a predefined rule is proposed to calculate a PRB-level offset. The offset value depends on the bandwidth and the size of reserved radio resources for the common EPDCCH set. To be more precise, the cell ID should be considered to have a cell-specific offset to support the ICIC. Moreover, to enable the location of the common EPDCCH set hopping subframe by subframe, or based on a basic unit of a couple of subframes, the subframe index is used to calculate the additional offset. If the offset value changes with a couple of subframes, the subframe index used to calculate the offset can be the index of one subframe in the period. In the method, it is assumed that the offset value changes subframe by subframe. One example used to calculate the offset can be expressed as follows:

$$N_{offset}^{ECSS}=(N_{ID}^{cell}+n_{sf}) \bmod \lfloor N_{RB}^{DL}/N_{RB}^{ECSS} \rfloor \quad \text{Eq (11)}$$

where $N_{ID}^{cell}$ is the physical cell ID, $n_{sf}$ is the subframe index, $N_{RB}^{DL}$ is the downlink channel bandwidth and the possible values of $N_{RB}^{DL}$ are {6, 15, 25, 50, 75, 100}, and $N_{RB}^{ECSS}$ is the ECCE number per PRB pair.

Then, an exemplary expression used to determine the reserved radio resources can be expressed as follows:

$$\text{Index of } n\text{th PRB pair}=(n \times \lfloor N_{RB}^{DL}/N_{RB}^{ECSS} \rfloor + (N_{ID}^{cell}+n_{sf}) \bmod \lfloor N_{RB}^{DL}/N_{RB}^{ECSS} \rfloor) \bmod N_{RB}^{DL} \quad \text{Eq(12)},$$

Where n=0, ..., $N_{RB}^{ECSS}-1$, and $N_{RB}^{DL}$ is the downlink channel bandwidth and the possible values of $N_{RB}^{DL}$ are {6, 15, 25, 50, 75, 100}.

In the method, a new additional CRC mask for the CRC of the MIB is used to indicate the size of the reserved resources for the common EPDCCH set, and different masks correspond to different values of $N_{RB}^{ECSS}$. Thus, the UEs may obtain the size of the radio resources by decoding the CRC mask blindly. Table 6 shows an example of the additional CRC mask. In Table 6, the CRC mask is denoted as {x0, x1, ..., x15} for explanation. Different kinds of masks can be defined to indicate $N_{RB}^{ECSS}$, and may not reduce performance of the PBCH.

TABLE 6

| $N_{RB}^{ECSS}$ | CRC mask {x0, x1, . . . , x15} |
| --- | --- |
| 2 | {0, 0, 0, 0, 0, 0, 0, 0, 0, 0, 0, 0, 0, 0, 0, 0} |
| 4 | {0, 0, 0, 0, 1, 1, 1, 1, 1, 1, 1, 1, 0, 0, 0, 0} |
| 8 | {1, 1, 1, 1, 0, 0, 0, 0, 0, 0, 0, 0, 1, 1, 1, 1} |

Figure 19:
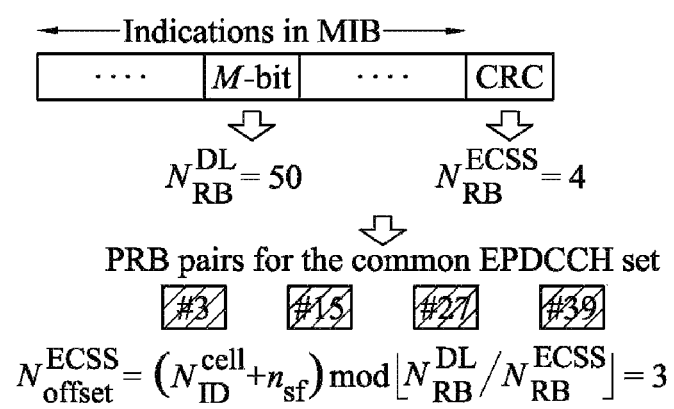
FIG. 19 is a schematic diagram illustrating an example of determining the location of the common EPDCCH set under the case of $N_{RB}^{DL}=50$, $N_{RB}^{ECSS}=4$ and $N_{ID}^{cell}=3$ and $n_{sf}=0$ in the proposed method #5 according to one embodiment of the present invention.

FIG. 19 is a schematic diagram illustrating an example of determining the location of the common EPDCCH set under case of $N_{RB}^{DL}=50$, $N_{RB}^{ECSS}=4$, $N_{ID}^{cell}=3$ and $n_{sf}=0$ in the proposed method #5 according to one embodiment of the present invention. In FIG. 19, the UE obtains the size of the reserved radio resources for the EPDCCH set by decoding the CRC mask blindly. Then, the UE calculates the offset value according to the available parameters and determines the location of the common EPDCCH set finally.

Method #6 for the Indication of the Location of the Common EPDCCH Set Under the Design Direction Based on the MIB+EPCFICH In the proposed method, different sizes of the reserved radio resources for the common EPDCCH set are specified and indexed in a table. An indicator in the MIB is used to inform the UE of an index for the size. To be more precise, a rule is predefined to calculate the additional offset of the reserved resources. An indicator in the EPCFICH informs the UE the actually used resources. Another indicator in the MIB indicates the size of reserved resources for the EPCFICH. An additional offset used to the resources of the EPCFICH is calculated according to a predefined rule. The details of the embodiments are described below.

To reduce the complexity and the signaling overhead, the possible values of $N_{RB}^{ECSS}$ are {2, 4, 8}. One consideration is that there are 576 REs in 4 RPB pairs, which is equal to 16 CCEs. In the legacy PDCCH, 16 CCEs are reserved for the transmission of the CSS. When the collision signals is considered, such as CRS, CSI-RS, PSS/SSS and DMRS, the number of available REs within 4 PRB pairs may be less than 16 CCEs. Then, the search space needs to be extended. As discussed in RAN 1, 2 ECCEs per PRB pair can be applied under some conditions. Therefore, $N_{RB}^{ECSS}=8$ is considered. To be more precise, when the complexity of the blind decoding is considered, a smaller size should be considered in cases with a smaller ECSS. Therefore, $N_{RB}^{ECSS}=2$ is used.

As discussed above, an additional offset $N_{offset}^{ECSS}$ is added to the reserved radio resources based on a basic unit of the PRB pair, the ECCE or the EREG. In the method, a predefined rule is proposed to calculate a PRB-level offset. The offset value depends on the bandwidth and the size of the reserved radio resources for the common EPDCCH set. To be more precise, the cell ID should be considered to have a cell-specific offset to support ICIC. Moreover, to enable the location of the common EPDCCH set hopping subframe by subframe, or based on a basic unit of a couple of subframes, the subframe index is used as another parameter to calculate the additional offset. If the offset value changes with a couple of subframes, the subframe index can be the index of one subframe in the period. In the method, it is assumed that the offset value changes subframe by subframe. One example used to calculate the offset can be expressed as follows:

$$N_{offset}^{ECSS}=(N_{ID}^{cell}+n_{sf}) \bmod \lfloor N_{RB}^{DL}/N_{RB}^{ECSS} \rfloor \quad \text{Eq (13)},$$

where $N_{ID}^{cell}$ is the physical cell ID, $n_{sf}$ is the subframe index, $N_{RB}^{DL}$ is the downlink channel bandwidth and the possible values of $N_{RB}^{DL}$ are {6, 15, 25, 50, 75, 100}, and $N_{RB}^{ECSS}$ is the ECCE number per PRB pair.

Then, an exemplary expression used to determine the location of the common EPDCCH set can be expressed as follows:

$$\text{Index of } n\text{th PRB pair} = (n \times \lfloor N_{RB}^{DL}/N_{RB}^{ECSS} \rfloor + (N_{ID}^{cell} + n_{sf}) \bmod \lfloor N_{RB}^{DL}/N_{RB}^{ECSS} \rfloor) \bmod N_{RB}^{DL} \qquad \text{Eq(14)},$$

where $n = 0, \ldots, N_{RB}^{DL}-1$, and $N_{RB}^{DL}$ is the downlink channel bandwidth and the possible values of $N_{RB}^{DL}$ are $\{6, 15, 25, 50, 75, 100\}$.

In the method, the possible values for $N_{RB}^{ECSS}$ are $\{2, 4, 8\}$. One possible solution is to indicate the value explicitly by an indicator. Thus, an indicator with 3 bits in the MIB may be used to indicate the exact value of the resource size. Another solution is to indicate the value implicitly by specifying a table, wherein different indices indicate different sizes of the reserved radio resources. Thus, an indicator with 2 bits in the MIB may be used to inform the UE the index. In the method, the latter solution is applied. Table 7 shows an example of indexing the size. For explanation, the indicator is noted as $\{a0, a1\}$. It should be noted that, the value of the size depends on the downlink channel bandwidth. For example, in cases with $N_{RB}^{DL} < 10$, the possible values for $N_{RB}^{ECSS}$ are $\{2, 4\}$; in cases with $10 \leq N_{RB}^{DL} < 25$, the possible values for $N_{RB}^{ECSS}$ are $\{2, 4, 8\}$; otherwise, the possible values for $N_{RB}^{ECSS}$ may be 4 and 8.

TABLE 7

| Index | Value |
| --- | --- |
| 0 | 2 |
| 1 | 4 |
| 2 | 8 |

In the method, the EPCFICH is used to indicate the used PRB pairs among the reserved radio resources for the common EPDCCH set to improve the resource efficiency. The EPCFICH can be transmitted in every subframe or with a period of a couple of subframes. It should be noted that, the period of the MIB must be a multiple of the period of the EPCFICH; otherwise a mismatch may occur between the actually used resources and the size of the reserved resources for the common EPDCCH set. In the method, the EPCFICH is transmitted in every subframe.

In the method, there are two possible options to indicate the value. Option#1 is to use a bitmap with $N_{RB}^{ECSS}$ bits in the EPCFICH to support the dynamic resource allocation. For explanation, the indicator is noted as $\{b(0), \ldots, b(N_{RB}^{ECSS}-1)\}$. For example, in cases with $N_{RB}^{DL}=50$, $N_{RB}^{ECSS}=4$, $N_{offset}^{ECSS}=7$, a bitmap $\{1, 0, 1, 0\}$ indicates PRB pair #7 and #31 for the EPDCCH transmission in the common EPDCCH set, while PRB pair #7, #19, #31 and #43 are reserved for the reserved resources for the common EPDCCH set. In the example, a load size of the EPCFICH varies with $N_{RB}^{ECSS}$. Option #2 is to design an indicator with 8 bits, i.e., the load size of the EPCFICH is fixed as the maximum value for $N_{RB}^{ECSS}$. Under Option #2, the indicator in the EPCFICH is noted as $\{b(0), \ldots, b(7)\}$ for explanation. Therefore, the UEs only decode the least significant bits (LSB). For example, only $b(4) \sim b(7)$ are decoded in cases with $N_{RB}^{ECSS}=4$, while only $b(5)$ and $b(6)$ are decoded in cases with $N_{RB}^{ECSS}=2$.

In the method, it is assumed that the EPCFICH is transmitted by using two ECCEs, wherein the size of the ECCEs is about 72 bits. The main consideration is to achieve a 1/16 coding rate to guarantee the performance of the EPCFICH. In the legacy EPCFICH, the 1/16 coding rate is achieved by transmitting 2 bits over 16 REs, wherein QPSK modulation is applied. For the EPCFICH, at most 8 bits are transmitted in the method. It is assumed that QPSK is applied to the EPCFICH, the 1/16 coding rate may be obtained in case of 72 REs. A lower coding rate can be obtained by allocating more resources for the EPCFICH.

According to the discussion, the possible values for $N_{RB}^{EPCFICH}$ are $\{4, 8\}$, wherein 4-order or 8-order diversity is obtained for the EPCFICH. To be more precise, a flag in the MIB is used to indicate the value of $N_{RB}^{EPCFICH}$. The flag is noted as $c_0$. For example, $c_0=1$ means $N_{RB}$ and $c_0=0$ means $N_{RB}^{EPCFICH}4$. To be more precise, an additional offset $N_{offset}^{ECSS}$ is added to the reserved resources based on a basic unit of the PRB pair, the EREG, the RE or the minimum resource unit for the EPCFICH. In the method, a PRB-level offset is considered. The offset value depends on the downlink channel bandwidth and the size of the resources for the EPCFICH. To be more precise, the cell ID should be considered to have a cell-specific offset to support the ICIC. Moreover, the offset hops with the transmission period of the EPCFICH to randomize the interference from the EPCFICH to the neighboring cells. If the offset value changes with a couple of subframes, the subframe index used to calculate the offset can be the index of one subframe in the period. In the method, the offset value changes subframe by subframe.

One example used to calculate the offset can be expressed as follows:

$$N_{offset}^{EPCFICH} = (N_{ID}^{cell} + n_{sf}) \bmod \lfloor N_{RB}^{DL}/N_{RB}^{EPCFICH} \rfloor \qquad \text{Eq (15)},$$

where $N_{ID}^{cell}$ is the physical cell ID, $n_{sf}$ is the subframe index.

Then, an exemplary expression used to reserve the PRB pairs for the EPCFICH can be expressed as follows:

$$\text{Index of } n\text{th PRB pair} = (n \times \lfloor N_{RB}^{DL}/N_{RB}^{EPCFICH} \rfloor + (N_{ID}^{cell} + n_{sf}) \bmod \lfloor N_{RB}^{DL}/N_{RB}^{EPCFICH} \rfloor) \bmod N_{RB}^{DL} \qquad \text{Eq(16)}$$

where $n = 0, \ldots, N_{RB}^{EPCFICH}-1$.

Since only a part of the reserved resources are used for the EPCFICH, the remaining unused resources may be used by other channels. A rule may be predefined to stipulate which resources are used for the EPCFICH. For example, the 1st EREG and 4th EREG of each reserved PRB pair are used for the EPCFICH in cases with 4 PRB pairs, and the 1st EREG of each reserved PRB pair is used for the EPCFICH in cases with 8 PRB pairs.

Figure 20:
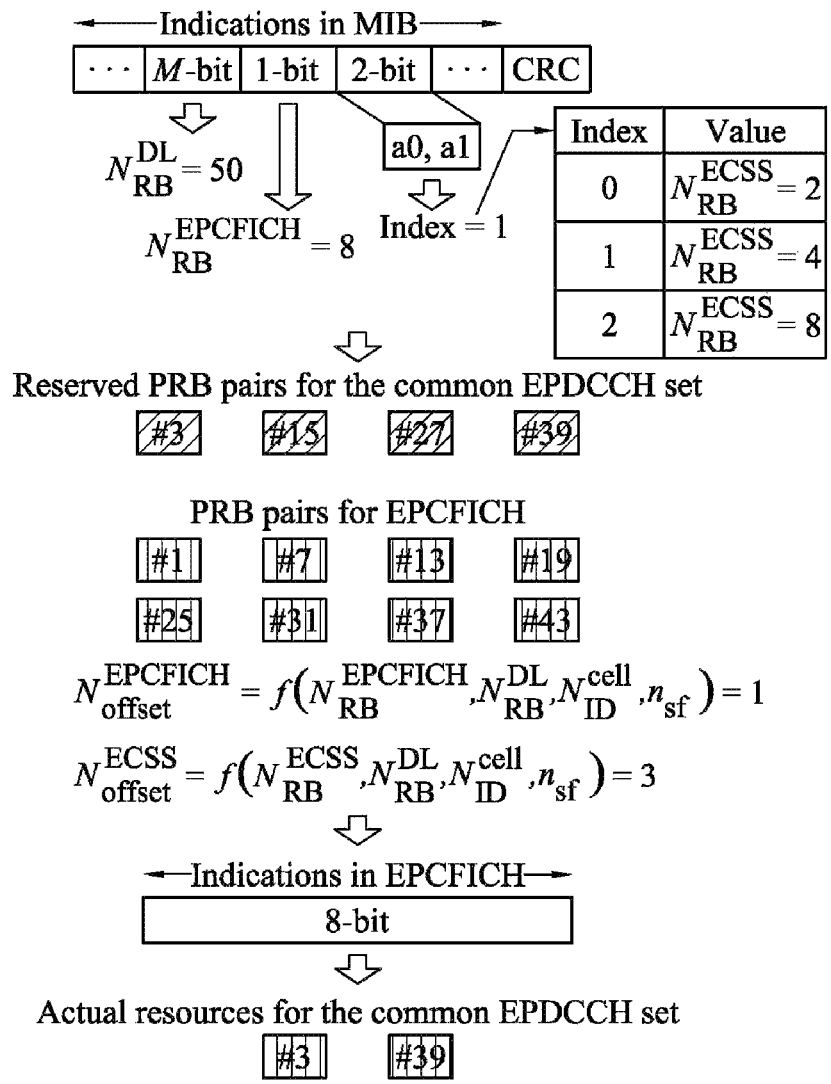
FIG. 20 is a schematic diagram illustrating an example of determining the location of the common EPDCCH set under the case of $N_{RB}^{DL}=50$, $N_{RB}^{ECSS}=4$ and $N_{ID}^{cell}=3$ and $n_{sf}=6$, and $N_{RB}^{EPCFICH}=8$ in the proposed method #6 according to one embodiment of the present invention.

FIG. 20 is a schematic diagram illustrating an example of determining the location of the common EPDCCH set in cases where $N_{RB}^{DL}=50$, $N_{RB}^{ECSS}=4$ and $N_{ID}^{cell}=3$, $n_{sf}=6$, and $N_{RB}^{EPCFICH}=8$ in the proposed method #6 according to one embodiment of the present invention. In FIG. 20, the UE first determines the size of the EPCFICH by decoding a flag in the MIB and calculating the offset. Then, the UE obtains the index of a specific setting by decoding the indicator in the MIB. Next, the UE determines the size of reserved resources for the common EPDCCH set by checking the index in a table, wherein the index value is obtained in MIB. Furthermore, the UE determines the reserved resources for the common EPDCCH set by calculating the offset. Finally, the UE determines the actual resources for the common EPDCCH set by decoding the bitmap in the EPCFICH.

Method #7 for the Indication of the Location of the Common EPDCCH Set Under the Design Direction Based on the MIB+EPCFICH In the proposed method, different formats of a new additional CRC mask for the CRC of the MIB are specified. A CRC mask is used to inform the UEs of the size of the radio resources. To be more precise, a rule is predefined to calculate the additional offset to the reserved resources. An indicator in the EPCFICH informs the UE the actually used resources for the common EPDCCH set. Another indicator in the MIB indicates the size of the reserved resources for the EPCFICH. An additional offset used to the resources of the EPCFICH is calculated according to a predefined rule. The details of the embodiments are described below.

To reduce the complexity and the signaling overhead, the possible values of $N_{RB}^{ECSS}$ are {2, 4, 8}. One consideration is that there are 576 REs in 4 RPB pairs, which is equal to 16 CCEs. In the legacy PDCCH, 16 CCEs are reserved for the transmission of the CSS. When the collision signals is considered, such as CRS, CSI-RS, PSS/SSS and DMRS, the number of available REs within 4 PRB pairs may be less than 16 CCEs. Then, the search space needs to be extended. As discussed in RAN 1, 2 ECCEs per PRB pair can be applied under some conditions. Therefore, $N_{RB}^{ECSS}=8$ is considered. To be more precise, when the complexity of the blind decoding is considered, a smaller size should be considered in cases with a smaller ECSS. Therefore, $N_{RB}^{ECSS}=2$ is used.

As discussed above, an additional offset $N_{offset}^{ECSS}$ added to the reserved resources based on a basic unit of the PRB pair, the ECCE or the EREG. In the method, a predefined rule is proposed to calculate a PRB-level offset. The offset value depends on the bandwidth and the size of reserved radio resources for the common EPDCCH set. To be more precise, the cell ID should be considered to have a cell-specific offset to support ICIC. Moreover, to enable the location of the common EPDCCH set hopping subframe by subframe, or based on a basic unit of a couple of subframes, the subframe index is used as another parameter to calculate the additional offset. If the offset value changes with a couple of subframes, the subframe index can be the index of one subframe in the period. In the method, it is assumed that the offset value changes subframe by subframe. One example used to calculate the offset can be expressed as follows:

$$N_{offset}^{ECSS}=(N_{ID}^{cell}+n_{sf}) \bmod \lfloor N_{RB}^{DL}/N_{RB}^{ECSS}\rfloor \quad \text{Eq (17)},$$

where $N_{ID}^{cell}$ is the physical cell ID, $n_{sf}$ is the subframe index, $N_{RB}^{DL}$ is the downlink channel bandwidth and the possible values of $N_{RB}^{DL}$ are {6, 15, 25, 50, 75, 100}, and $N_{RB}^{ECSS}$ is the ECCE number per PRB pair.

Then, an exemplary expression used to determine the reserved radio resources can be expressed as follows:

$$\text{Index of } n\text{th PRB pair}=(n\times\lfloor N_{RB}^{DL}/N_{RB}^{ECSS}\rfloor + (N_{ID}^{cell}+n_{sf}) \bmod \lfloor N_{RB}^{DL}/N_{RB}^{ECSS}\rfloor) \bmod N_{RB}^{DL} \quad \text{Eq(18)},$$

where $n=0, \ldots, N_{RB}^{ECSS}-1$, and $N_{RB}^{DL}$ is the downlink channel bandwidth and the possible values of $N_{RB}^{DL}$ are {6, 15, 25, 50, 75, 100}.

In the method, a new CRC mask for the CRC of the MIB is used to indicate the size of the reserved resources for the common EPDCCH set, and different masks correspond to different values of $N_{RB}^{ECSS}$. Thus, the UEs may obtain the size of the radio resources by decoding the CRC mask blindly. Table 8 shows an example of the additional CRC mask. In Table 8, the CRC mask is denoted as {x0, x1, . . . , x15} for explanation. Different kinds of masks can be defined to indicate $N_{RB}^{ECSS}$, and may not reduce a performance of the PBCH.

TABLE 8

| $N_{RB}^{ECSS}$ | CRC mask {x0, x1, . . . , x15} |
|---|---|
| 2 | {0, 0, 0, 0, 0, 0, 0, 0, 0, 0, 0, 0, 0, 0, 0, 0} |
| 4 | {0, 0, 0, 0, 1, 1, 1, 1, 1, 1, 1, 1, 0, 0, 0, 0} |
| 8 | {1, 1, 1, 1, 0, 0, 0, 0, 0, 0, 0, 0, 1, 1, 1, 1} |

In the method, the EPCFICH is used to indicate the used PRB pairs among the reserved resources for the common EPDCCH set to improve the resource efficiency. The EPCFICH can be transmitted in every subframe or with a period of a couple of subframes. It should be noted that, the period of the MIB must be a multiple of the period of the EPCFICH; otherwise a mismatch may occur between the actually used resources and the size of the reserved resources for the common EPDCCH set. In the method, the EPCFICH is transmitted in every subframe.

In the method, there are two possible options to indicate the value. Option#1 is to use a bitmap with $N_{RB}^{ECSS}$ bits in the EPCFICH to support the dynamic resource allocation. For explanation, the indicator is noted as {b(0), . . . , b($N_{RB}^{ECSS}-1$)}. For example, in cases with $N_{RB}^{DL}=50$, $N_{RB}^{ECSS}=4$, $N_{offset}^{ECSS}=7$, a bitmap {1, 0, 1, 0} indicates PRB pair #7 and #31 for the EPDCCH transmission within the common EPDCCH set, while PRB pair #7, #19, #31 and #43 are reserved for the reserved resources for the common EPDCCH set. In the example, the load size of the EPCFICH varies with $N_{RB}^{ECSS}$. Option #2 is to design an indicator with 8 bits, i.e., the load size of the EPCFICH is fixed as the maximum value for $N_{RB}^{ECSS}$. Under Option #2, the indicator in the EPCFICH is noted as {b(0), . . . , b(7)} for explanation. Therefore, the UE only decodes the least significant bits. For example, only b(4)~b(7) are decoded in cases with $N_{RB}^{ECSS}=4$, while only b(5) and b(6) are decoded in cases with $N_{RB}^{ECSS}=2$.

In the method, it is assumed that the EPCFICH is transmitted by using two ECCEs, wherein the size of the ECCEs is about 72 bits. The main consideration is to achieve a 1/16 coding rate to guarantee the performance of the EPCFICH. In the legacy EPCFICH, the 1/16 coding rate is achieved by transmitting 2 bits over 16 REs, wherein QPSK modulation is applied. For the EPCFICH, at most 8 bits are transmitted in the method. It is assumed that QPSK is applied to the EPCFICH, the 1/16 coding rate may be obtained in case of 72 REs. A lower coding rate can be obtained by allocating more resources for the EPCFICH.

According to the discussion, the possible values for $N_{RB}^{EPCFICH}$ are {4, 8}, wherein 4-order or 8-order diversity is obtained for the EPCFICH. To be more precise, a flag in the MIB is used to indicate the value of $N_{RB}^{EPCFICH}$. The flag is noted as $c_0$. For example, $c_0=1$ means $N_{RB}^{EPCFICH}=8$, and $c_0=0$ means $N_{RB}^{EPCFICH}=4$. To be more precise, an additional offset $N_{offset}^{ECSS}$ is added to the reserved resources based on a basic unit of the PRB pair, the EREG, the RE or the minimum resource unit for the EPCFICH. In the method, a PRB-level offset is considered. The offset value depends on the downlink channel bandwidth and the size of the resources the EPCFICH. To be more precise, the cell ID should be considered to have a cell-specific offset to support the ICIC. Moreover, the offset hops with the transmission period of the EPCFICH to randomize the interference from the EPCFICH to the neighboring cells. If the offset value changes with a couple of subframes, the subframe index used to calculate the offset can be the index of one subframe in the period. In the method, the offset value changes subframe by subframe.

One example used to calculate the offset can be expressed as follows:

$$N_{offset}^{EPCFICH} = (N_{ID}^{cell} + n_{sf}) \bmod \lfloor N_{RB}^{DL}/N_{RB}^{EPCFICH} \rfloor \qquad \text{Eq (19)},$$

where $N_{ID}^{cell}$ is the physical cell ID, $n_{sf}$ is the subframe index.

Then, an exemplary expression used to reserve the PRB pairs for the EPCFICH can be expressed as follows:

$$\text{Index of } n\text{th PRB pair} = (n \times \lfloor N_{RB}^{DL}/N_{RB}^{EPCFICH} \rfloor + (N_{ID}^{cell} + n_{sf}) \bmod \lfloor N_{RB}^{DL}/N_{RB}^{EPCFICH} \rfloor) \bmod N_{RB}^{DL} \qquad \text{Eq(16)}$$

where $n = 0, \ldots, N_{RB}^{EPCFICH} - 1$.

Since only a part of the reserved resources are used for the EPCFICH, the remaining unused resources may be used by other channels. A rule may be predefined to stipulate which resources are used for the EPCFICH. For example, the 1$^{st}$ EREG and 4$^{th}$ EREG of each reserved PRB pair are used for the EPCFICH in cases with 4 PRB pairs, and the 1$^{st}$ EREG of each reserved PRB pair is used for the EPCFICH in cases with 8 PRB pairs.

Figure 21:
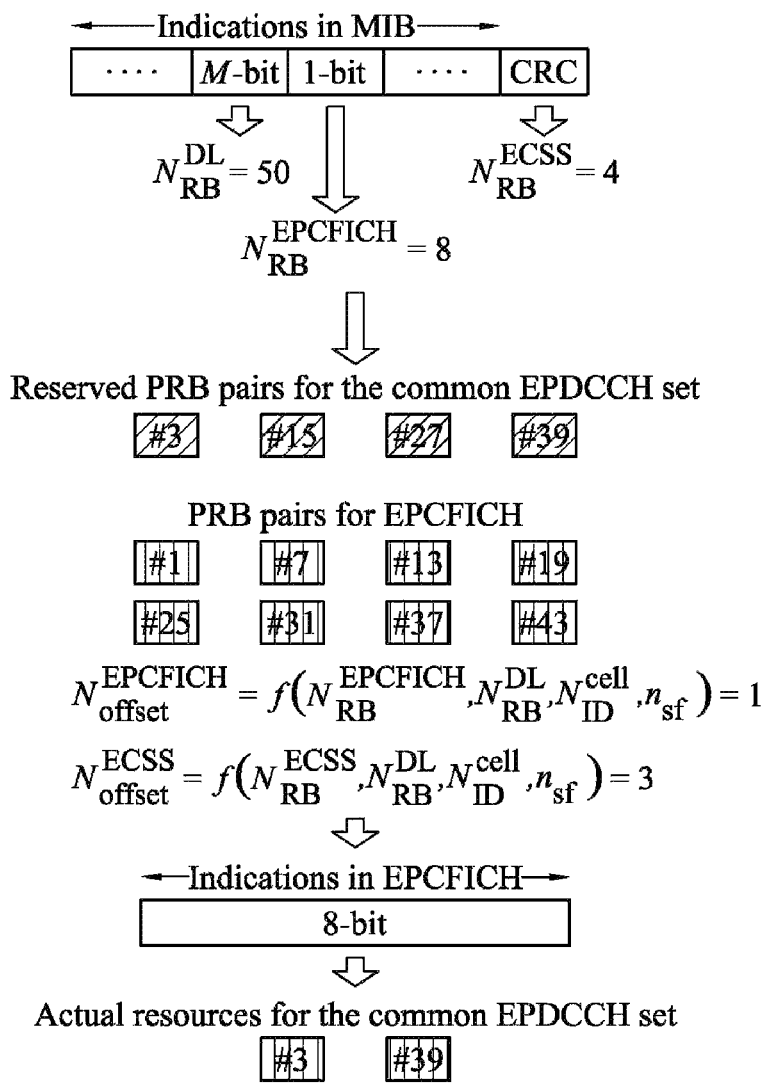
FIG. 21 is a schematic diagram illustrating an example of determining the location of the common EPDCCH set under the case of $N_{RB}^{DL}=50$, $N_{RB}^{ECSS}=4$ and $N_{ID}^{cell}=3$ and $n_{sf}=6$, and $N_{RB}^{EPCFICH}=8$ in the proposed method #7 according to one embodiment of the present invention.

FIG. 21 is a schematic diagram illustrating an example of determining the location of the common EPDCCH set in cases where $N_{RB}^{DL}=50$, $N_{RB}^{ECSS}=4$ and $N_{ID}^{cell}=3$, $n_{sf}=6$, and $N_{RB}^{EPCFICH}=8$ according to the proposed method #7 according to one embodiment of the present invention. In FIG. 21, the UE obtains the size of reserved resources for the common EPDCCH set by decoding the CRC mask for the MIB blindly. Then, the UE determines the location of the EPCFICH by decoding a flag in the MIB, and calculates an offset used for the EPCFICH. After decoding the indicator in the EPCFICH, UE determines the exact resources for the common EPDCCH set by calculating the offset.

Various aspects of the disclosure have been described above. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using another structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those with skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those with skill in the art will further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

While the invention has been described in connection with various aspects, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

The invention claimed is:

1. A method for obtaining scheduling information of a data channel by a user equipment (UE), comprising:
receiving a set of radio resources for a set of candidate control channels, wherein a part of the set of candidate control channels constitute the enhanced common search space (ECSS) for an enhanced physical downlink control channel (EPDCCH);
attempting to decode each candidate control channel to obtain a physical control channel; and
obtaining scheduling information of the data channel from the decoded physical control channel,
wherein the receiving step comprises receiving the set of radio resources for the set of candidate control channels according to an indication in a Master Information Block (MIB), and the indication in the MIB comprises a configured size of the set of radio resources for the ECSS.

2. The method of claim 1, wherein the set of radio resources is a set of radio resources spreading over partial channel bandwidth, and each candidate control channel occupies a subset of radio resources within the set of radio resources.

3. The method of claim 1, wherein the ECSS occupies a subset of the set of radio resources.

4. The method of claim 3, wherein the radio resources for the ECSS change with at least one subframe.

5. The method of claim 1, wherein the set of radio resources is predetermined according to a predefined rule.

6. The method of claim 5, wherein the predefined rule is based on a function of a cell ID.

7. The method of claim 1, further comprising:
receiving an additional indication of the set of radio resources for the set of candidate control channels from a dynamic indicator channel, wherein the additional indication indicates resource size for the ECSS.

8. The method of claim 7, further comprising:
receiving from MIB an indication of a set of radio resources for a dynamic indicator channel.

9. The method of claim 7, wherein the dynamic indicator channel is transmitted at least in every subframe.

10. The method of claim 7, wherein the dynamic indicator channel is included in a set of radio resources for the set of candidate control channels.

11. The method of claim 7, wherein the dynamic indicator channel occupies a set of radio resources separated from the set of radio resources for the set of candidate control channels.

12. The method of claim 7, wherein the dynamic indicator channel indicates the resource size of the ECSS, and the indication in the MIB comprises a configured size of the set of radio resources for the ECSS.

13. The method of claim 12, wherein the dynamic indicator channel is concluded in a Enhanced Physical Control Format Indication Channel (EPCFICH).

14. The method of claim 1, wherein the configured size of the ECSS is decoded from a bit mask of cyclic redundancy check (CRC) bits of the MIB.

15. The method of claim 1, wherein the indication in the MIB comprises an offset value, which is added to the location of the ECSS according to a third predefined rule.

16. The method of claim 15, wherein the offset value is a physical radio resource offset.

17. The method of claim 16, wherein a basic unit of the physical radio resource offset is PRB pairs.

18. The method of claim 15, wherein the offset value is a logical radio resource offset.

19. The method of claim 1, wherein the indication in the MIB comprises a configuration index in a configuration table, which lists a plurality of configurations determining different physical locations of the ECSS.

20. The method of claim 1, wherein the set of radio resources is a set of physical resource block (PRB) pairs.

21. The method of claim 1, wherein the candidate control channels are of distributed type.

22. The method of claim 1, wherein the set of candidate control channels further includes a second set of candidate control channels that constitute an enhanced UE-specific search space (EUSS).

23. The method of claim 22, wherein the EUSS is reconfigured via a higher-layer message.

24. The method of claim 1, wherein the set of radio resources for a set of candidate control channels vary at least every subframe to a second predefined rule.

25. An apparatus for obtaining scheduling information of a data channel, operating as User Equipment (UE), comprising:
a wireless circuitry, configured to perform wireless transmission and reception to and from a service network; and
a controller circuitry, coupled to the wireless circuitry and configured to receive a set of radio resources for a set of candidate control channels, wherein a part of the candidate control channels constitute the enhanced common search space (ECSS) for an enhanced physical downlink control channel (EPDCCH), attempting to decode each candidate control channel to obtain a physical control channel, and obtaining scheduling information of the data channel from the decoded physical control channel,
wherein the controller circuitry further receives the set of radio resources for a set of candidate control channels according to an indication in a Master Information Block (MIB), and the indication in the MIB comprises a configured size of the set of radio resources for the ECSS.

26. The apparatus of claim 25, wherein the set of radio resources is a set of radio resources spreading over partial channel bandwidth, and each candidate control channel occupies a subset of the predetermined set of radio resources according to a predefined rule.

27. The apparatus of claim 26, wherein the predefined rule is based on a function of a cell ID.

28. The apparatus of claim 25, wherein each candidate control channel occupies a subset of radio resources within the set of radio resources.

29. The apparatus of claim 28, wherein the controller circuitry further receives an additional indication of the set of radio resources for the set of candidate control channels from a dynamic indicator channel, wherein each candidate control channel occupies a subset of radio resources in the set of radio resources.

30. The apparatus of claim 29, wherein the dynamic indicator channel is transmitted at least in every subframe.

31. The apparatus of claim 29, wherein the dynamic indicator channel is included in a set of radio resources for the set of candidate control channels.

32. The apparatus of claim 29, wherein the dynamic indicator channel occupies a set of radio resources separated from the set of radio resources for the set of candidate control channels.

33. The apparatus of claim 28, wherein the indication in the MIB comprises a configuration index in a configuration table, which lists a plurality of configurations determining different physical locations of the ECSS.

34. The apparatus of claim 25, wherein the configured size of the ECSS is decoded from a bit mask of cyclic redundancy check (CRC) bits of the MIB.

35. The apparatus of claim 34, wherein the indication in the MIB comprises an offset value, which is added to the location of the ECSS according to a predefined rule.

36. The apparatus of claim 35, wherein the offset value is a physical radio resource offset.

37. The apparatus of claim 36, wherein a basic unit of the physical radio resource offset is PRB pairs.

38. The apparatus of claim 35, wherein the offset value is a logical radio resource offset.

39. The apparatus of claim 25, wherein the set of radio resources is a set of physical resource block (PRB) pairs.

40. The apparatus of claim 25, wherein the candidate control channels are of distributed type.

41. The apparatus of claim 25, wherein the set of candidate control channels further includes a second set of candidate control channels that constitute an enhanced UE-specific search space (EUSS).

42. The apparatus of claim 41, wherein the EUSS is reconfigured via a higher-layer message.

43. The apparatus of claim 25, wherein the radio resources for the ECSS changes with at least one subframe.

* * * * *